(12) United States Patent
Gonidec et al.

(10) Patent No.: US 12,545,416 B2
(45) Date of Patent: Feb. 10, 2026

(54) PROPULSION ASSEMBLY FOR AN AIRCRAFT, COMPRISING AN INTERMEDIATE COWL OF THE STATIONARY, REMOVABLE TYPE, MOUNTED ON A HINGE SYSTEM

(71) Applicant: SAFRAN NACELLES, Gonfreville-l'Orcher (FR)

(72) Inventors: Patrick Gonidec, Moissy-Cramayel (FR); Patrick André Boileau, Moissy-Cramayel (FR); Albin Lafont, Moissy-Cramayel (FR); Jérémie Sartori, Moissy-Cramayel (FR); Caroline Gerard, Moissy-Cramayel (FR); Frédéric Boudehen, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/852,153

(22) PCT Filed: Mar. 30, 2023

(86) PCT No.: PCT/FR2023/050461
§ 371 (c)(1),
(2) Date: Sep. 27, 2024

(87) PCT Pub. No.: WO2023/187298
PCT Pub. Date: Oct. 5, 2023

(65) Prior Publication Data
US 2025/0206453 A1  Jun. 26, 2025

(30) Foreign Application Priority Data
Mar. 31, 2022 (FR) ...................... 2202936

(51) Int. Cl.
*B64D 29/00* (2006.01)
*B64C 1/14* (2006.01)
(Continued)

(52) U.S. Cl.
CPC ................ *B64D 29/00* (2013.01); *B64C 7/02* (2013.01); *B64D 29/06* (2013.01); *B64D 29/08* (2013.01);
(Continued)

(58) Field of Classification Search
CPC ........... B64C 1/14; B64C 1/1446; B64C 7/02; B64D 29/00; B64D 29/06; B64D 29/08;
(Continued)

(56) References Cited

U.S. PATENT DOCUMENTS 3,591,111 A * 7/1971 Spence ................. B64C 1/1415
244/129.5
6,220,546 B1 * 4/2001 Klamka ................. B64D 29/00
244/129.4
(Continued)

FOREIGN PATENT DOCUMENTS

EP   1112931 B1   4/2004
FR   3004700 A1   10/2014

OTHER PUBLICATIONS

Corresponding International Patent Application No. PCT/FR2023/050461, International Search Report, date mailed Jul. 13, 2023.
(Continued)

*Primary Examiner* — Jason H Duger
(74) *Attorney, Agent, or Firm* — McDonald Hopkins LLC

(57) ABSTRACT

An aircraft propulsion unit including a nacelle comprising a fan compartment, a front cowling forming an air inlet, and an intermediate section having at least one removable fixed intermediate cowling, externally delimiting the fan compartment, and attached to another structure of the propulsion unit (Continued)

by removable through fasteners. The intermediate cowling is connected to another element of the propulsion unit by means of a hinge system which, as a result of removing the removable through fasteners, is designed to allow the intermediate cowling to be moved between a closed position, in which it extends continuously with the front cowling, and an open position, in which the intermediate cowling is shifted upstream or downstream so as to open the fan compartment.

11 Claims, 14 Drawing Sheets

(51) Int. Cl.
 *B64C 7/02* (2006.01)
 *B64D 29/06* (2006.01)
 *B64D 29/08* (2006.01)
 *F02K 1/70* (2006.01)
 *F02K 1/76* (2006.01)
 *F02K 1/80* (2006.01)

(52) U.S. Cl.
 CPC .............. *F02K 1/763* (2013.01); *F02K 1/766* (2013.01); *B64C 1/14* (2013.01); *B64C 1/1446* (2013.01); *F02K 1/70* (2013.01); *F02K 1/80* (2013.01)

(58) Field of Classification Search
 CPC . F02K 1/70; F02K 1/763; F02K 1/766; F02K 1/80
 See application file for complete search history.

(56) References Cited

U.S. PATENT DOCUMENTS

| | | | |
|---|---|---|---|
| 2007/0267539 A1 | 11/2007 | Bulin | |
| 2007/0278345 A1* | 12/2007 | Oberle | B64D 29/06 244/53 R |
| 2010/0040466 A1 | 2/2010 | Vauchel et al. | |
| 2012/0280081 A1 | 11/2012 | Calder et al. | |
| 2014/0301835 A1* | 10/2014 | Popescu | B64D 29/08 415/182.1 |

OTHER PUBLICATIONS

Corresponding International Patent Application No. PCT/FR2023/050461, Written Opinion, date mailed Jul. 13, 2023.

\* cited by examiner

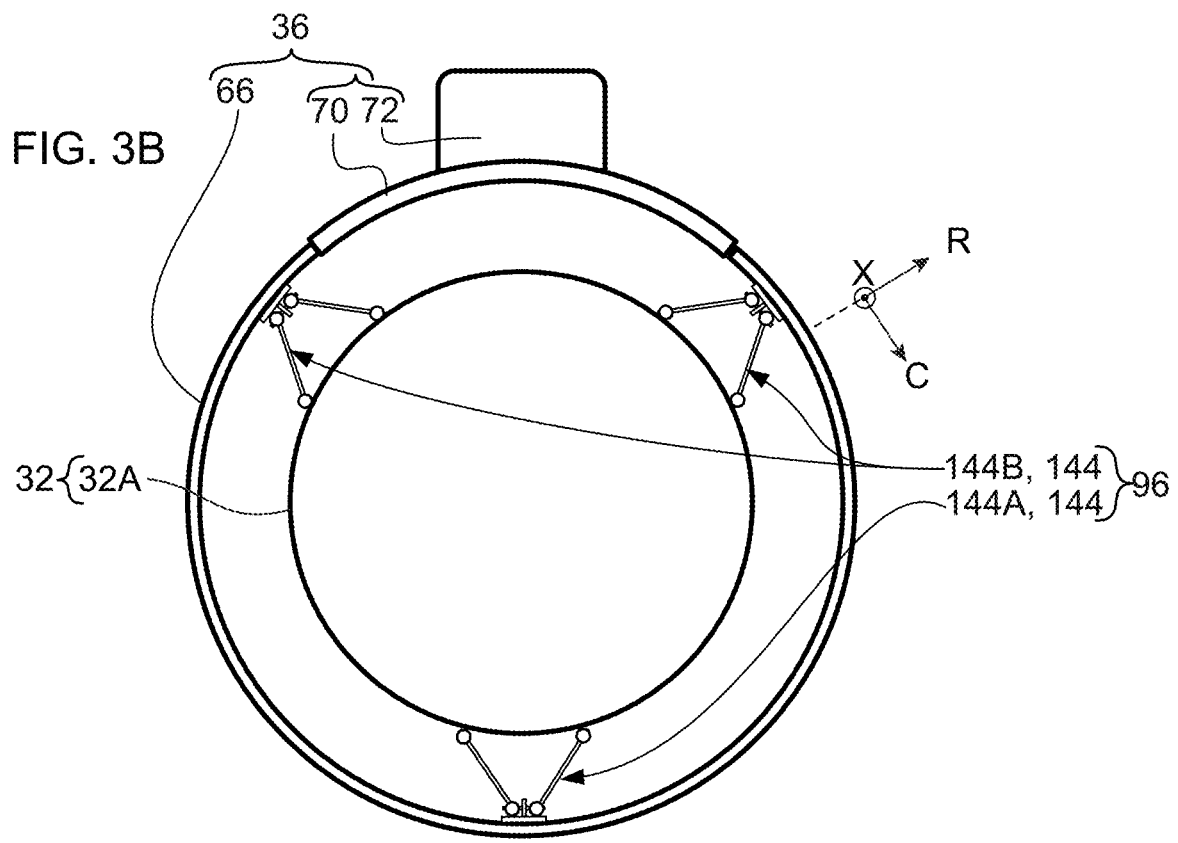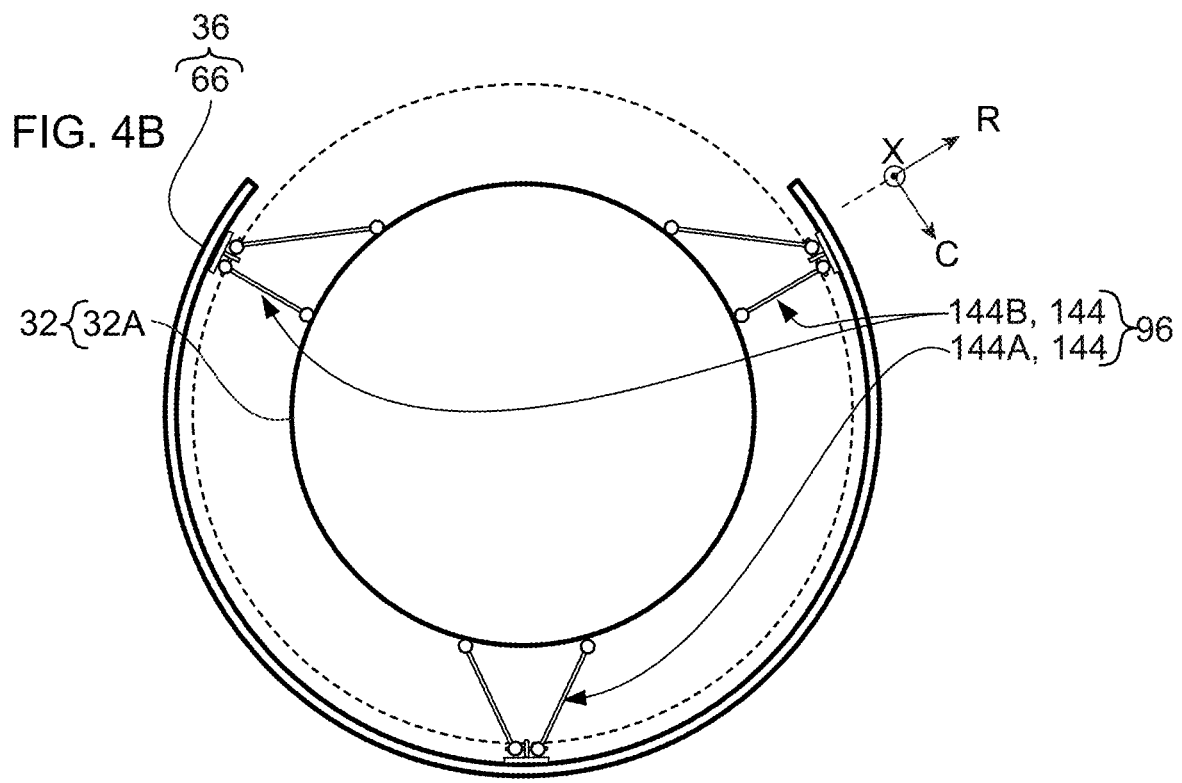

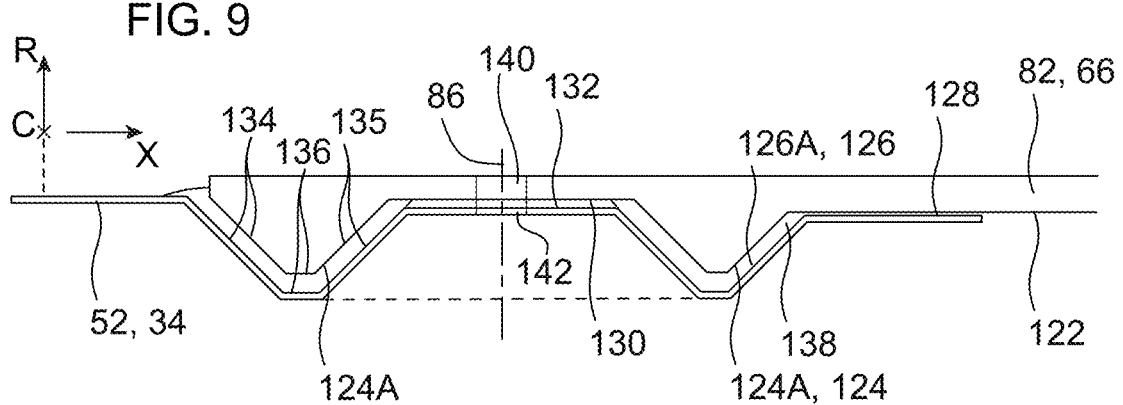
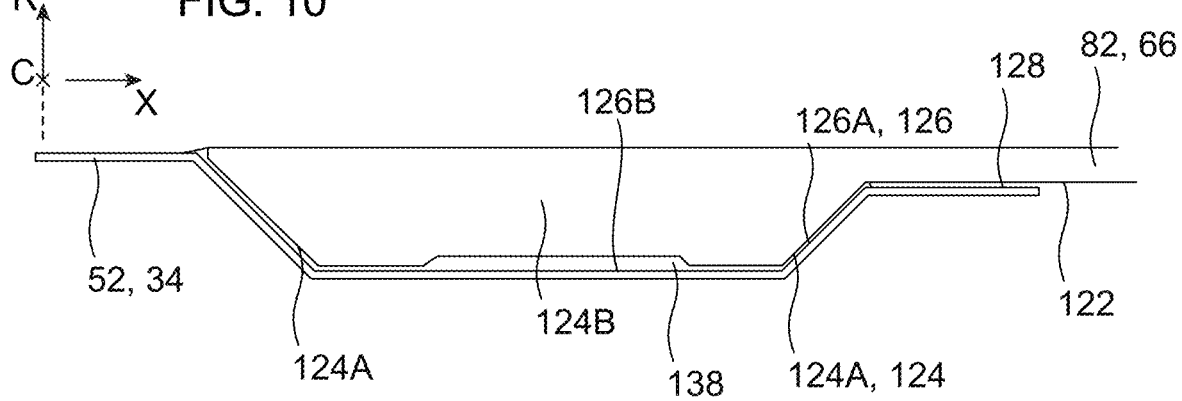
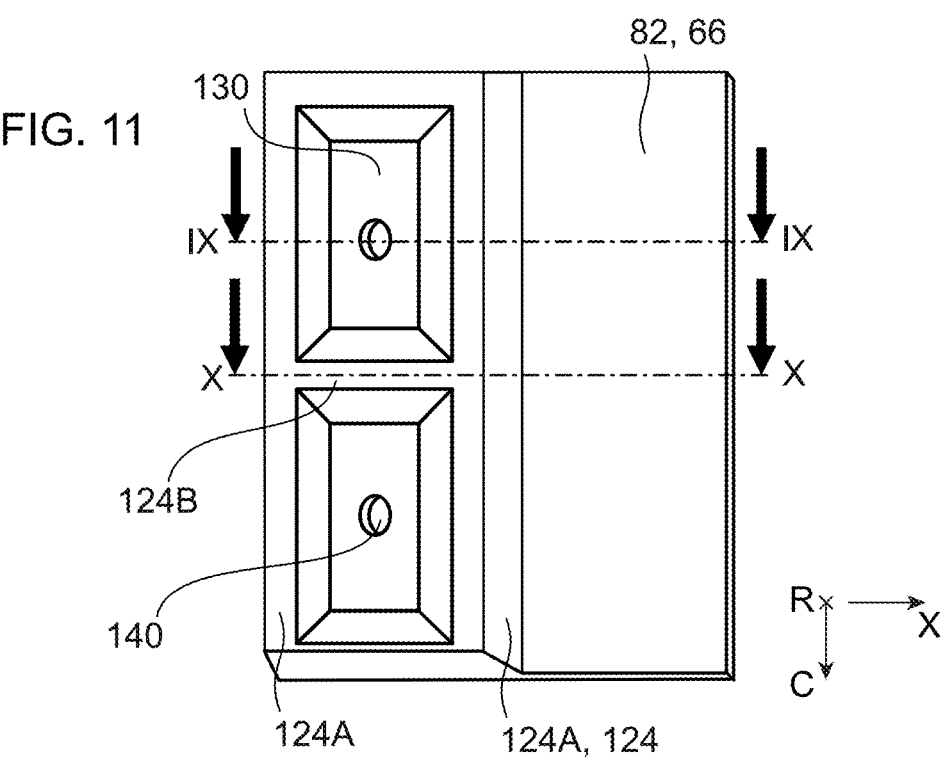

PROPULSION ASSEMBLY FOR AN AIRCRAFT, COMPRISING AN INTERMEDIATE COWL OF THE STATIONARY, REMOVABLE TYPE, MOUNTED ON A HINGE SYSTEM

CROSS-REFERENCE TO RELATED APPLICATIONS

This is the National Stage application of PCT international application PCT/FR2023/050461, filed on Mar. 30, 2023, which claims the priority of French Patent Application No. 2202936, filed Mar. 31, 2022, both of which are incorporated herein by reference in their entireties.

TECHNICAL FIELD

The present invention pertains to the field of aircraft propulsion units, and more specifically relates to a propulsion unit whose nacelle is of the type whose intermediate section includes one or more removable fixed cowlings, i.e. cowlings rigidly attached to the rest of the nacelle by means of through fasteners that must be removed in order to provide access to the inside of the propulsion unit.

PRIOR ART

An aircraft propulsion unit nacelle generally has a tubular structure comprising, from upstream to downstream, a front section comprising an air inlet, an intermediate section designed to surround a turbojet engine fan, and a rear section including thrust reversal means and designed to surround the gas generator of the turbojet engine.

The air inlet, generally in the shape of a ring, is designed to separate, during operation, the air flow entering the turbojet engine and the air flow bypassing the propulsion unit.

Generally speaking, the nacelle must be mechanically rigid enough to limit deformation caused by operating stresses.

In some nacelles, the cowlings of the intermediate section, commonly known as fan cowls, are hinged to a fixed structure of the nacelle or of the pylon of the propulsion unit and are thus able to pivot laterally from a closed position to an open position, in a so-called "butterfly" movement, to provide access to the inside of the propulsion unit, for example for maintenance operations. These nacelles generally have a significant weight, take up a lot of space, cost a lot of money and require high loads to open.

In other nacelles, particularly when it is desirable to avoid the aforementioned drawbacks, the cowlings of the intermediate section are rigidly attached to the rest of the nacelle by means of removable through fasteners, such as bolts, that must be removed in order to access the inside of the propulsion unit. In this case, the cowlings may be described as "fixed" and "removable". This solution is particularly suitable for a front section designed without a rear partition, i.e. without a wall transversely connecting an inner shell of the front section to an outer shell of the front section behind and at a distance from the air inlet.

Document FR3004700 discloses an exemplary nacelle with removable fixed cowlings.

The object of the present invention is to improve nacelles with such cowlings.

DISCLOSURE OF THE INVENTION

To this end, it proposes an aircraft propulsion unit, comprising:
a turbojet engine comprising a fan and a fan casing surrounding the fan; and
a nacelle surrounding the turbojet engine and comprising a fan compartment delimited internally by the fan casing;
wherein the nacelle comprises, from upstream to downstream along an axis of the propulsion unit:
a front cowling forming an air inlet; and
an intermediate section having at least one removable fixed intermediate cowling, externally delimiting the fan compartment, and attached to at least one other structure of the propulsion unit by removable through fasteners.

According to the invention, said at least one intermediate cowling is connected to another element of the propulsion unit by means of a hinge system which, by removing said removable through fasteners, is designed to allow the intermediate cowling to be moved between a closed position, in which the intermediate cowling extends continuously with the front cowling, and an open position, in which the intermediate cowling is shifted upstream or downstream relative to its location in the closed position so as to open the fan compartment.

The hinge system supports the intermediate cowling in the open position, thus avoiding the need for maintenance operators to handle this cowling by carrying it to place it on a suitable support, which, in addition to requiring such a support to be provided, can prove tiring or even dangerous for operators.

In preferred embodiments, the hinge system has at least two hinge devices each having a first end hinged to said at least one intermediate cowling, and a second end, opposite, hinged to said other element of the propulsion unit, so as to allow the intermediate cowling to move between the closed position and the open position, preferably in translation, in particular in curvilinear translation.

In preferred embodiments, each of the hinge devices comprises at least one passive sliding link member designed to allow a variation in the spacing between the first end and the second end of the hinge device.

In preferred embodiments, said passive sliding link member is a passive actuator.

In preferred embodiments, each of the hinge devices also comprises means for constraining the first end of the hinge device along an elliptical path.

In preferred embodiments, said means for constraining the first end of the hinge device along the elliptical path comprise:
a first pulley mounted on said at least one intermediate cowling;
two second pulleys mounted on said other element of the propulsion unit so as to define substantially two foci of the elliptical path; and
a closed cable engaged around the first pulley and the second pulleys so as to force the first pulley to follow the elliptical path.

In preferred embodiments, said at least one intermediate cowling has an inner surface provided with first raised features designed to engage by fitting together with second features with a complementary shape formed on an outer surface of said at least one other structure of the propulsion unit, in the closed position.

In preferred embodiments, said at least one other structure of the propulsion unit comprises at least one of the front cowling, a rear partition rigidly supported by the fan casing, and another cowling of the intermediate section.

In preferred embodiments, said at least one intermediate cowling comprises a lower cowling extending at least in a lower angular portion of the propulsion unit, for which said removable through fasteners comprise at least first removable through fasteners by which said lower cowling is attached to said other structure of the propulsion unit, for which said other element of the propulsion unit is the turbojet engine, and for which the open position is a position in which said lower cowling is transversely spread, by means of a circumferential bending deformation of said lower cowling, and axially offset, relative to its location in the closed position.

In preferred embodiments, the propulsion unit also comprises a pylon connected to the turbojet engine, said at least one intermediate cowling comprises an upper cowling comprising a pylon fairing and an apron extending circumferentially on either side of the pylon fairing, and the pylon fairing extends in front of the pylon in continuity with the latter in the closed position and is spaced apart from the pylon in the open position.

In preferred embodiments, the upper cowling has a rear support surface arranged so as to exert pressure against a support structure of the pylon when the air inlet is subjected to a vertical thrust from bottom to top.

In preferred embodiments, the upper cowling has an inner reinforcing structure having a closed hollow section, and an inner support structure embedded in the inner reinforcing structure and having said rear support surface, and said support structure of the pylon has a front support surface arranged axially facing and in contact with the rear support surface of the inner reinforcing structure, when the upper cowling is in the closed position.

BRIEF DESCRIPTION OF THE DRAWINGS

The invention will be better understood and other details, advantages and features will become apparent upon reading the following description provided by way of non-limiting example and with reference to the appended drawings wherein:

FIG. 3B is a partial schematic view of the propulsion unit in cross-section along the plane B-B shown in FIG. 3A, showing in particular the upper cowling and the lower cowling in their closed positions;

FIG. 4B is a view similar to FIG. 3B showing in particular the lower cowling in its open position;

FIG. 9 is a partial schematic view of the propulsion unit shown in any one of FIGS. 3A, 5 and 7 in axial section, showing a region of overlap of an end part of the lower cowling and an end part of an adjacent cowl or cowling, along the plane IX-IX shown in FIG. 11;

FIG. 10 is a view similar to FIG. 9, along the plane X-X shown in FIG. 11;

FIG. 11 is a partial schematic view of said end part of the lower cowling, viewed radially from the inside;

In all of these figures, identical reference numerals may designate identical or similar elements.

DETAILED DISCLOSURE OF PREFERRED EMBODIMENTS

Figure 1:
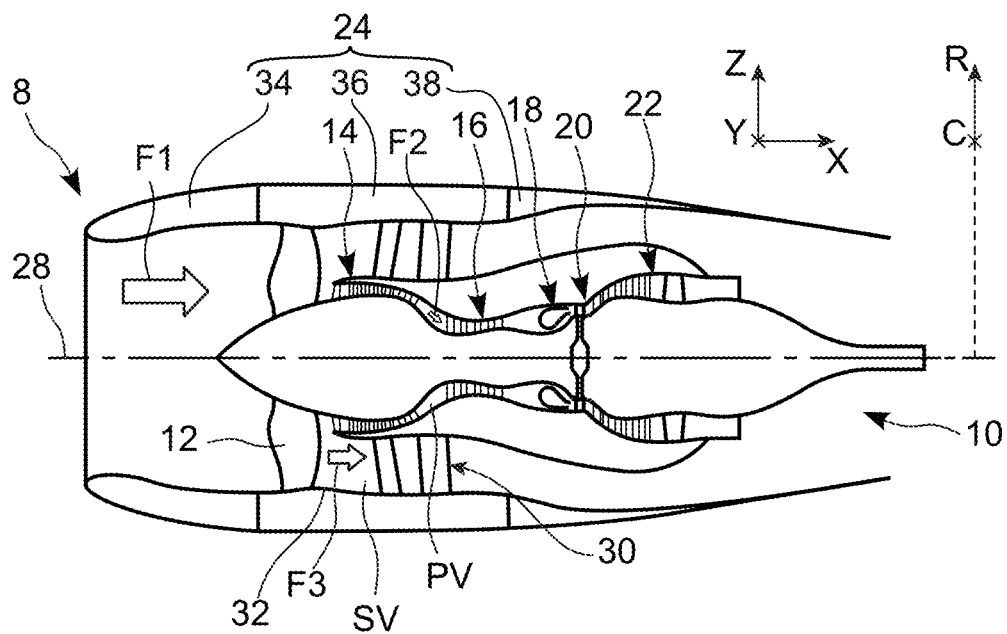
FIG. 1 is a partial schematic view of an aircraft propulsion unit in axial section, showing a nacelle and a turbojet engine thereof.

FIG. 1 shows an aircraft propulsion unit 8, comprising a turbojet engine 10 for example of the twin-spool turbojet type, the latter generally including a fan 12 intended to suck in an air flow F1 splitting downstream of the fan into a primary flow F2 circulating in a primary flow channel, hereinafter known as the primary duct PV, within the core of the turbojet engine, and a secondary flow F3 bypassing this core in a secondary flow channel, hereinafter known as the secondary duct SV.

The core of the turbojet engine includes, generally, a low-pressure compressor 14, a high-pressure compressor 16, a combustion chamber 18, a high-pressure turbine 20 and a low-pressure turbine 22.

The respective rotors of the high-pressure compressor and of the high-pressure turbine are connected by a shaft referred to as the "high-pressure shaft", whereas the respective rotors of the low-pressure compressor and of the low-pressure turbine are connected by a shaft referred to as the "low-pressure shaft", in a well-known manner.

The turbojet engine is enclosed by a nacelle 24 surrounding the secondary duct SV. Moreover, the rotors of the turbojet engine are rotatably mounted about an axis of the turbojet engine, which coincides with the axis of the nacelle 24 within the propulsion unit 8. These two axes are designated interchangeably by the reference numeral 28 throughout this description.

Throughout this description, the axial direction X is the direction of the axis 28, the vertical direction Z is a direction orthogonal to the axial direction X and oriented vertically when the propulsion unit 8 is fitted to an aircraft stationed on the ground, and the transverse direction Y is orthogonal to the two preceding directions. Furthermore, the radial direction R and the circumferential direction C or azimuthal direction are defined with reference to the axis 28, while the "upstream" and "front" directions on the one hand, and "downstream" and "rear" on the other hand, are defined in the direction of the axis 28, in reference to the general direction of gas flow in the turbojet engine, from upstream or the front to downstream or the rear.

The turbojet engine comprises an inter-compressor casing 30 arranged axially between the low-pressure compressor 14 and the high-pressure compressor 16. In the non-limiting context of a twin-spool turbojet, such an inter-compressor casing 30 is sometimes known as an intermediate casing.

Furthermore, the inter-compressor casing 30 carries a fan casing 32 arranged upstream of it, around the fan 12.

In addition, the nacelle 24 comprises, from front to rear, a front section consisting of a front cowling 34 forming a lip-shaped air inlet at its upstream end, an intermediate section 36, and a rear section 38.

Figure 2:
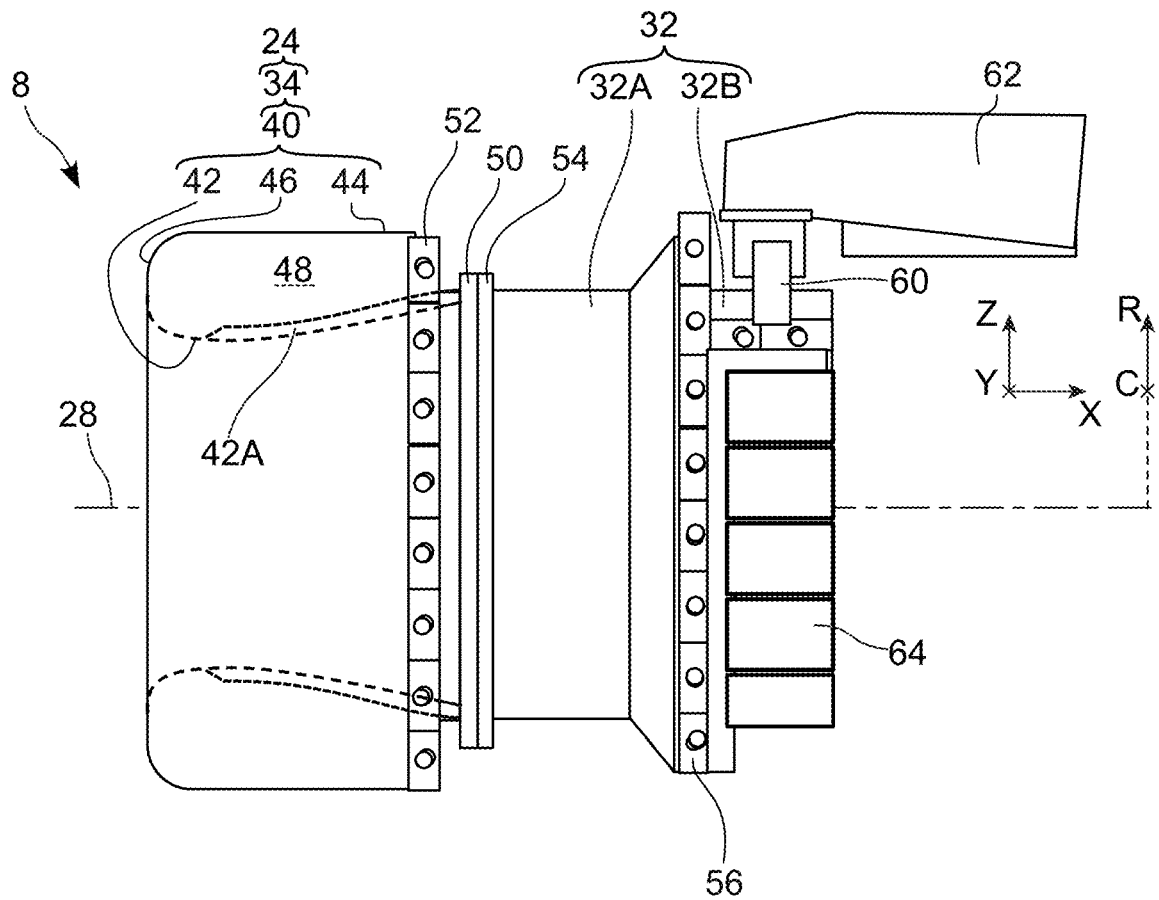
FIG. 2 is a partial schematic side view of the propulsion unit, showing a front part of a pylon, and elements of the nacelle and turbojet engine of the propulsion unit.

With reference to FIG. 2, the front cowling 34 mainly has an outer wall 40 with a generally C-shaped cross-section, convex in an upstream direction, intended to separate, during operation, the air flow entering the turbojet engine 10 and the air flow bypassing the propulsion unit 8. The outer wall 40 thus has two opposite end portions respectively defining an inner shell 42 (shown as a dashed line in FIG. 2) and an outer shell 44, connected to one another by an intermediate portion 46 of annular shape with a convex cross-section. The outer wall 40 thus delimits a front portion of an inner volume of the nacelle 24, hereinafter referred to as fan compartment 48. The inner shell 42 has, for example, a rear end portion forming an acoustic panel 42A (as shown by dashed line in FIG. 2). The inner 42 and outer 44 shells and the intermediate portion 46 of the outer wall 40 are preferably integrally formed such that the front cowling 34 is of the type commonly called an "extended front lip", but these elements can alternatively be assembled to one another by means of removable fasteners such as bolts.

The inner shell 42 defines, at its rear end, an inner rear end 50 of the front cowling 34, whereas the outer shell 44 defines, at its rear end, an outer rear end 52 of the front cowling 34.

The inner rear end 50 forms an annular flange, sometimes referred to as flange A1, by means of which the front cowling 34 is rigidly removably attached to an upstream annular flange 54 of the fan casing 32, for example by means of one or more annular rows of removable through fasteners such as bolts.

The fan casing 32 also has a downstream annular partition 56, hereinafter referred to as rear partition, arranged downstream relative to the upstream annular flange 54. This rear partition 56 extends radially outwards so as to form an attachment support for the intermediate section 36, as will be explained more clearly below. The rear partition 56 thus axially splits the fan compartment 48 into two parts, namely the aforementioned front portion thereof and a rear portion. In the present invention, the front portion 32A of the fan casing is the part thereof arranged upstream of the rear partition 56 and which helps internally delimit the front portion of the fan compartment 48, and the rear portion 32B of the fan casing is the part thereof arranged downstream of the rear partition 56 and which helps internally delimit the rear portion of the fan compartment 48.

FIG. 2 shows in particular a front engine mount 60 connected to the rear portion 32B of the fan casing and by means of which the turbojet engine 10 is connected to a pylon 62 of the propulsion unit 8, only one front part of which is shown in FIG. 2 and the following figures. The front engine mount 60 extends into the rear portion of the fan compartment 48.

FIG. 2 also shows a thrust reverser cascade 64 in an advanced position suitable for operation of the propulsion unit in direct thrust mode. In such an advanced position, the cascade 64, which is integral with the rear section 38 of the nacelle, extends around the rear portion 32B of the fan casing 32. The teachings of the present invention can advantageously be applied to propulsion units in which the rear section of the nacelle comprises a sliding cascade thrust reverser, i.e. where the cascade can be moved between an advanced position for operation in direct thrust mode, and a retraced position for operation in thrust reversal mode.

With reference to FIGS. 3A, 3B and 4A, 4B, the intermediate section 36 of the nacelle has a lower cowling 66 extending around the front portion 32A of the fan casing, i.e. radially facing it, and thus delimiting a part of the front portion of the fan compartment 48. This lower cowling 66 preferably consists of a single cowling, but can alternatively consist of a plurality of circumferentially juxtaposed cowlings, with or without overlap of their adjacent circumferential ends.

The intermediate section 36 also has an upper cowling 70 comprising a central portion forming a pylon fairing 72, and side portions extending circumferentially on either side of the pylon fairing 72 and forming an apron 74. The upper cowling 70 delimits another part of the front portion of the fan compartment 48 as well as a part of the rear portion of the fan compartment 48.

The lower cowling 66 and the rear cowling 70 each constitute an intermediate cowling, according to the terminology of the present invention.

The intermediate section 36 finally comprises a rear cowling 76 arranged behind the lower cowling 66. This rear cowling 76 preferably consists of a single cowling, but can alternatively consist of a plurality of circumferentially juxtaposed cowlings. The rear cowling 76 delimits another part of the rear portion of the fan compartment 48.

Figure 3A:
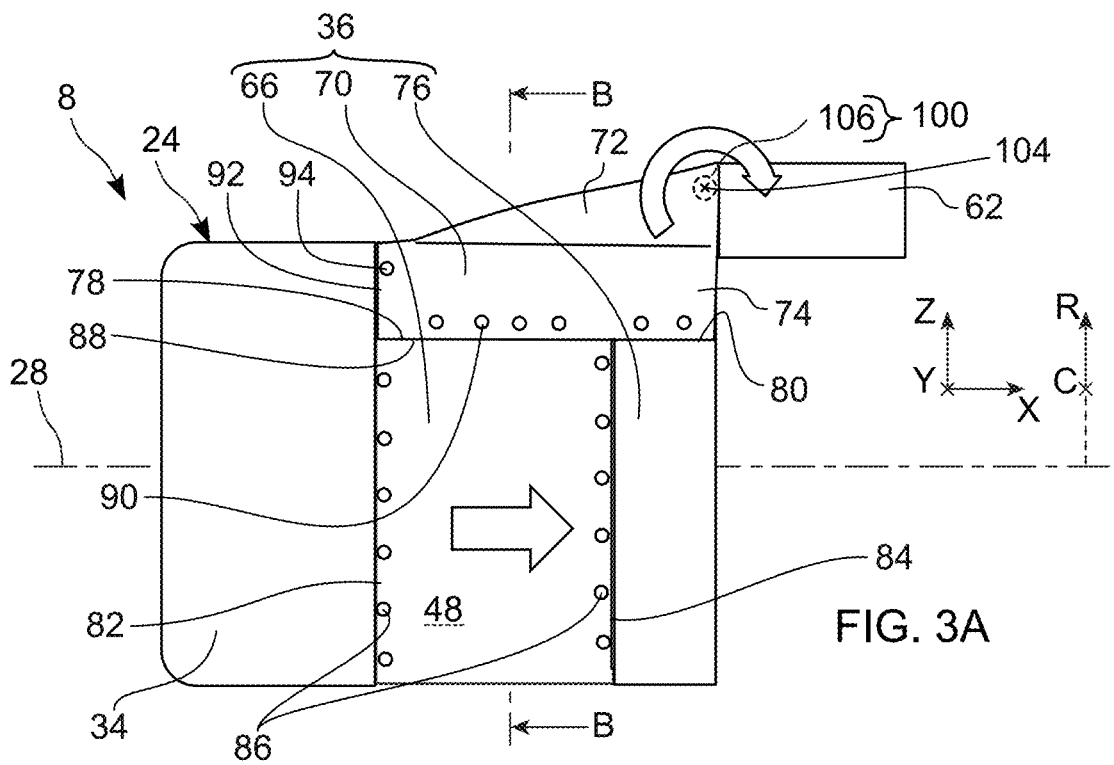
FIG. 3A is a partial schematic side view of the propulsion unit, showing a front part of the pylon and front and intermediate sections of the nacelle, and showing in particular an upper cowling and a lower cowling in their closed positions.

More specifically, the lower cowling 66 extends around a certain lower angular portion of the front portion 32A of the fan casing 32 around the axis 28, and has two circumferential ends 78 which reveal, between them, an upper angular portion of the front portion 32A of the fan casing 32 (FIGS. 3A and 3B). This upper angular portion of the front portion 32A is covered by the upper cowling 70. The lower angular portion of the front portion 32A extends, for example, more than 180 degrees around the axis 28, for example 300 degrees.

In a similar manner, the rear cowling 76 extends around a certain lower angular portion of the rear portion 32B of the fan casing 32 around the axis 28, and has two circumferential ends 80 which reveal, between them, an upper angular portion of the rear portion 32B of the fan casing 32. This upper angular portion of the rear portion 32B is also covered by the upper cowling 70. The lower angular portion of the rear portion 32B extends, for example, more than 180 degrees around the axis 28, for example 300 degrees.

The lower cowling 66, the rear cowling 76, and the upper cowling 70, are fixed and removable, i.e. they are attached to other structures of the propulsion unit, in this case elements of the nacelle and turbojet engine, by means of removable through fasteners.

In particular, the lower cowling 66 has a front end 82 attached to the outer rear end 52 of the front cowling 34, and a rear end 84 attached to the turbojet engine, in this case on the rear partition 56.

The front 82 and rear ends 84 of the lower cowling 66 are respectively attached to the front cowling 34 and to the rear partition 56 by means of first removable through fasteners 86.

Moreover, the circumferential ends 78 of the lower cowling 66 are respectively attached to circumferential ends 88 of the upper cowling 70. In the example shown, the circumferential ends 88 of the upper cowling 70 overlap the circumferential ends 78 of the lower cowling 66. Alternatively, the circumferential ends 78 of the lower cowling 66 can overlap the circumferential ends 88 of the upper cowling 70.

In a similar manner, the circumferential ends 80 of the rear cowling 76 are respectively attached to the circumferential ends 88 of the upper cowling 70. The circumferential ends 88 of the upper cowling 70 overlap the circumferential ends 80 of the rear cowling 76.

The circumferential ends 88 of the upper cowling 70 are attached to the circumferential ends 78 and 80 of the lower cowling 66 and of the rear cowling 76 by means of second removable through fasteners 90.

The upper cowling 70 also has a front end 92 attached to the outer rear end 52 of the front cowling 34 by means of third removable through fasteners 94.

According to a first aspect of the present invention, the lower cowling 66 is connected to the turbojet engine by means of a first hinge system 96.

The first hinge system 96 is designed to enable the lower cowling 66 to move between a closed position and an open position, once the first removable through fasteners 86 connecting the lower cowling 66 to the front cowling 34 and to the rear partition 56 are removed, and if applicable, once the second removable through fasteners 90 connecting the upper cowling 70 to the lower cowling 66 are also removed.

The closed position of the lower cowling 66 corresponds to the closed configuration shown in FIGS. 3A and 3B, in which the lower cowling 66 extends continuously in particular with the front cowling 34, but also, in the example shown, with the upper cowling 70 and with the rear cowling 76.

Figure 4A:
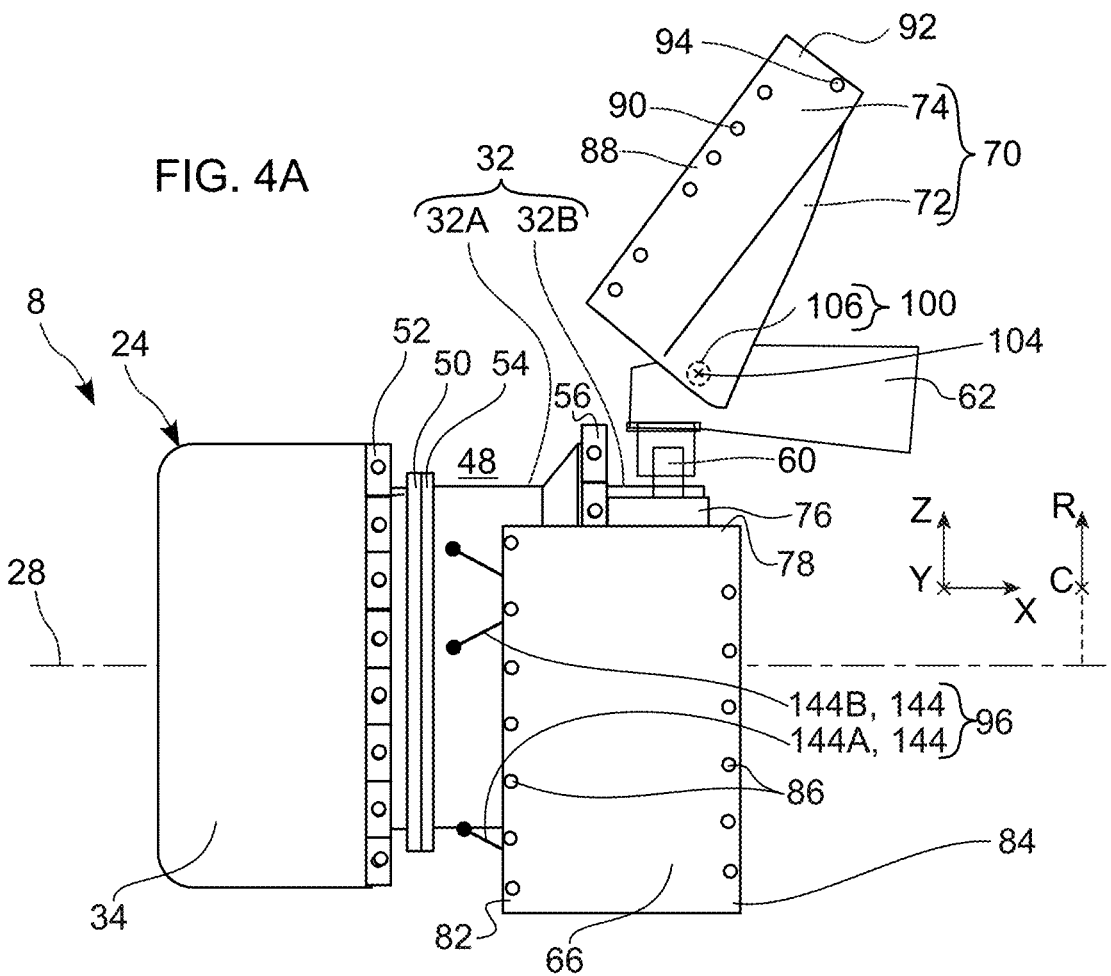
FIG. 4A is a view similar to FIG. 3A, showing the upper cowling and the lower cowling in their open positions.

The open position of the lower cowling 66, shown in FIGS. 4A and 4B, is a position in which the lower cowling 66 is spread radially outwards by elastic deformation following kinematics determined by the first hinge system 96, and is axially offset relative to its location in the closed position, so as to open the front portion of the fan compartment 48 and thus provide in particular access to the inner rear end 50 of the front cowling 34, for example to allow it to be removed. In the open position, the lower cowling 66 partially or completely covers the rear cowling 76, in the event of axial rearward movement. Alternatively, the lower cowling 66 can partially or completely cover the front cowling 34, in the event of axial forward movement.

The first hinge system 96 supports the lower cowling 66 in the open position, thus avoiding the need for maintenance operators to handle the lower cowling 66 by carrying it to place it on a suitable support, which, in addition to requiring such a support to be provided, can prove tiring or even dangerous for operators. The first hinge system 96 in particular causes elastic deformation of the lower cowling 66, resulting in the circumferential ends 78 thereof spreading outward from the nacelle and allowing the lower cowling 66 as a whole to move downwards, for example under the effect of its own weight, which makes it possible for the latter to be moved rearwards around the rear cowling 76 or forwards around the front cowling 34, for example under the effect of an operator, as will become clearer below in view of the detailed description of the first hinge system 96.

According to a second aspect of the present invention, the upper cowling 70 is connected to at least one of the turbojet engine 10 and the pylon 62, by means of a second hinge system 100, which has a similar advantage to the one mentioned above in relation to the lower cowling 66.

The second hinge system 100 is designed to enable the upper cowling 70 to move between a closed position and an open position, once the second removable through fasteners 90 connecting the upper cowling 70 to the lower cowling 66 are removed, and if applicable, once the third removable through fasteners 94 connecting the upper cowling 70 to the outer rear end 52 of the front cowling 34 are also removed.

The closed position of the upper cowling 70 corresponds to the closed configuration shown in FIGS. 3A and 3B, wherein the pylon fairing 72 extends in front of the pylon 62 continuously with the latter, and the apron 74 extends continuously aerodynamically with the lower cowling 66 and with the front cowling 34.

The open position of the upper cowling 70, shown in FIG. 4A, is a position in which the upper cowling 70 is shifted forward or backward relative to its location in the closed position so as to open the fan compartment 48, in particular the rear portion thereof, so as to provide in particular access to the front engine mount 60.

Moreover, in the event that, as in the examples shown, the circumferential ends 88 of the upper cowling 70 overlap the circumferential ends 78 of the lower cowling 66 in the closed configuration, the open position of the upper cowling 70 is such that the circumferential ends 88 of the upper cowling 70 are remote from the circumferential ends 78 of the lower cowling 66 so as to enable the lower cowling 66 to move between the closed position and the open position thereof.

In the example shown in FIGS. 3A and 4A, the second hinge system 100 is designed to form a pivot link between the upper cowling 70 and the pylon 62, and thus enable the upper cowling to rotate backwards about a transverse axis 104, to move from the closed position to the open position of the upper cowling 70. To this end, the second hinge system 100 has, for example, two pivots 106 arranged on each side of the pylon 62 (only one of these pivots is shown in FIGS. 3A and 4A).

Figure 5:
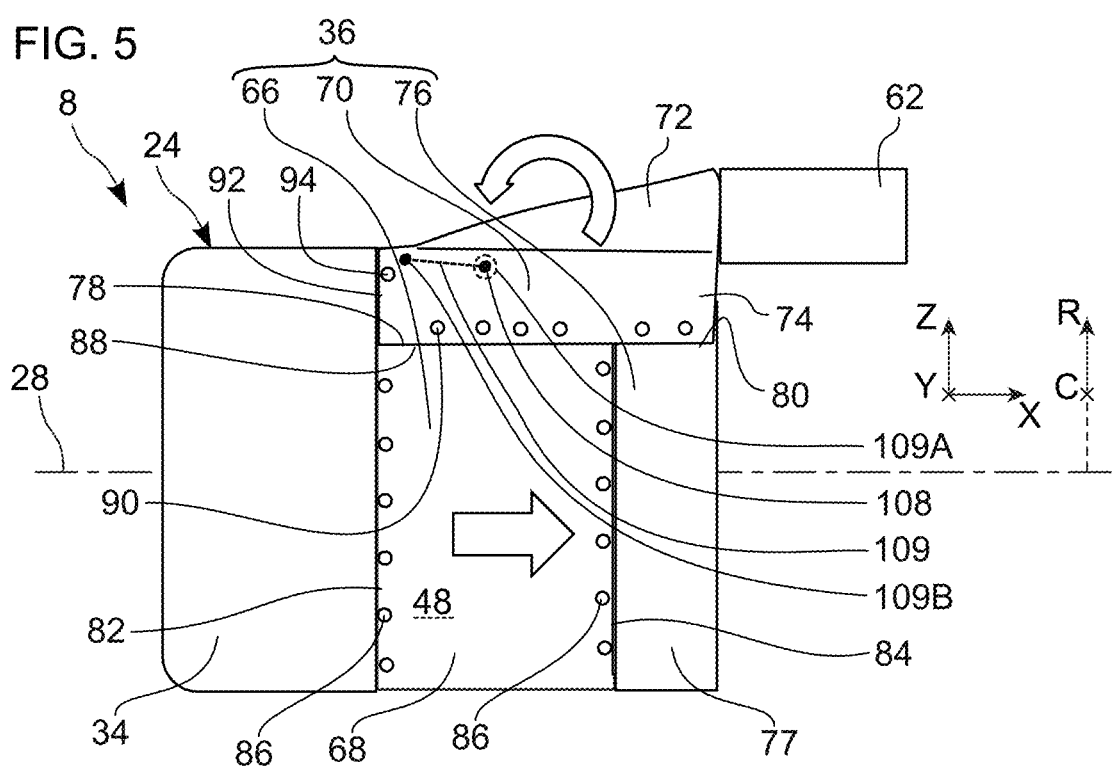
FIG. 5 is a view similar to FIG. 3A of a propulsion unit according to one variant.
Figure 6:
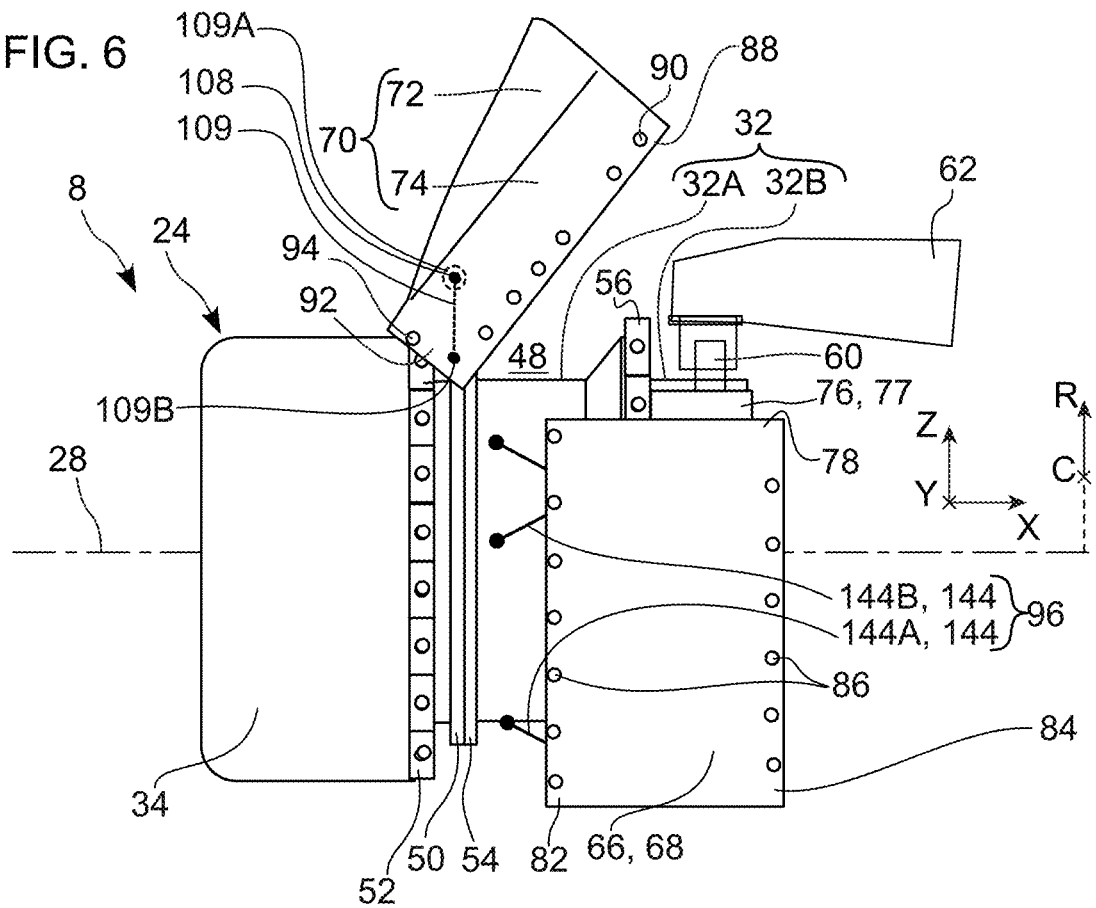
FIG. 6 is a view similar to FIG. 4A, showing the propulsion unit shown in FIG. 5.

FIGS. 5 and 6 show a variant in which the second hinge system 100 is designed to connect the upper cowling 70 to the fan casing 32 or to the front cowling 34 in a way that enables the upper cowling to rotate forwards about a movable transverse axis 108 to move from the closed position to the open position of the upper cowling 70. To this end, the second hinge system 100 has, for example, a connecting rod 109 having a first end 109A hinged to a front region of the upper cowling 70 and defining the movable transverse axis 108, and having a second end 109B hinged to the fan casing 32 or to the front cowling 34.

Figure 7:
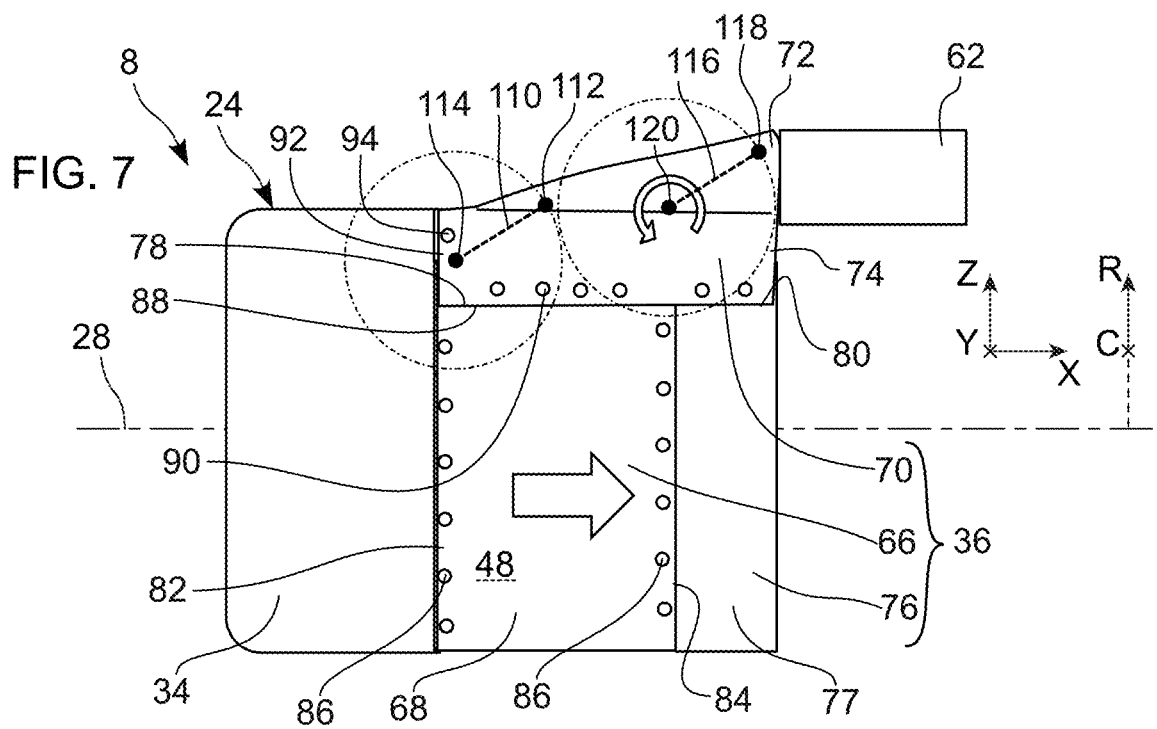
FIG. 7 is a view similar to FIG. 3A of a propulsion unit according to another variant.
Figure 8:
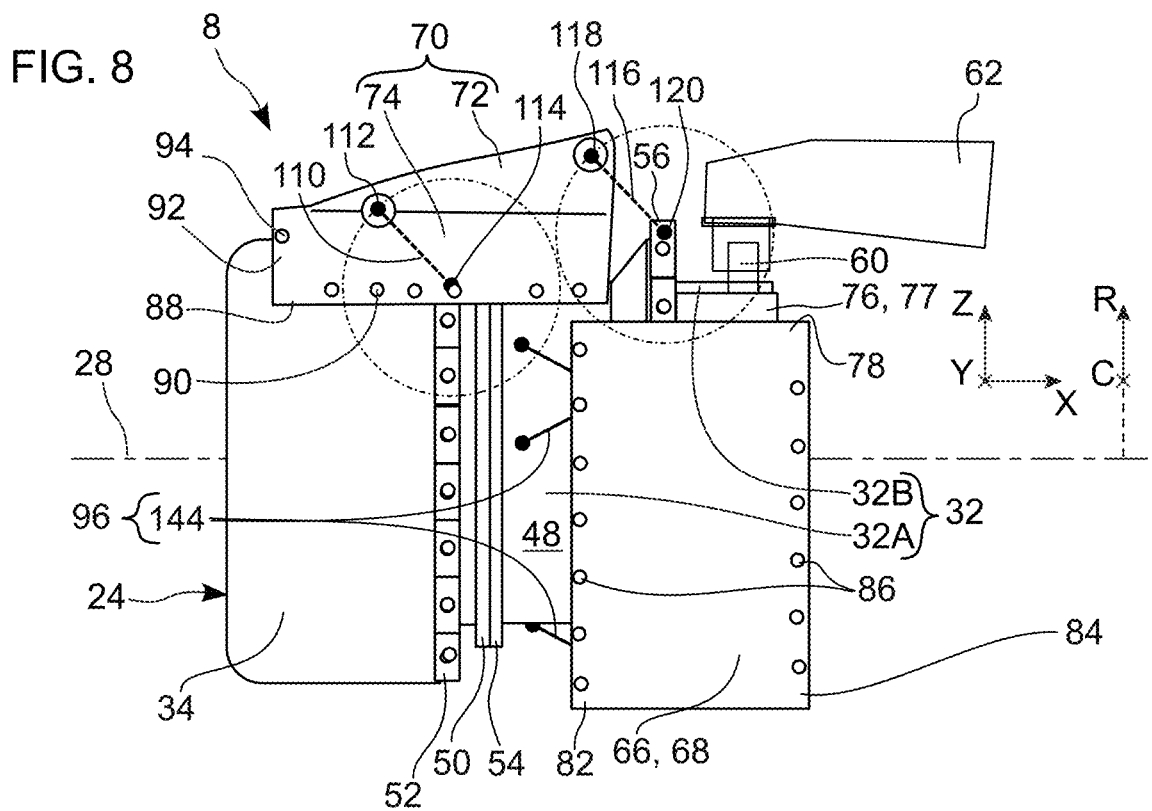
FIG. 8 is a view similar to FIG. 4A, showing the propulsion unit shown in FIG. 7.

FIGS. 7 and 8 show another variant, in which the second hinge system 100 has a deformable parallelogram configuration.

To this end, the second hinge system 100 has at least one front connecting rod 110 having a first end 112 hinged to a front region of the upper cowling 70, and having a second end 114 hinged to the fan casing 32 or to the front cowling 34, and in which the second hinge system 100 also has at least one rear connecting rod 116 having a first end 118 hinged to a rear region of the upper cowling 70, and having a second end 120 hinged to the fan casing 32, for example to the rear partition 56, or to another part of the turbojet engine.

The hinge system 100 can, of course, have two such front connecting rods 110 arranged symmetrically in relation to one another, on either side of a median vertical plane of the propulsion unit, and/or two such rear connecting rods 116 also arranged symmetrically in relation to one another, on either side of the median vertical plane.

The connecting rods 110, 116 are designed to guide the upper cowling 70 in a circular translational movement between the closed position and the open position thereof.

Alternatively, the connecting rods 110 and 116 can have different lengths such that the movement of the upper cowling 70 is a combination of curvilinear translation and rotation.

According to a third aspect of the present invention, with reference to FIGS. 9 to 12, at least one of the lower cowling 66 and the upper cowling 70 has an inner surface 122 provided with first raised features 124 designed to engage by fitting together with second features 126 with a complementary shape formed on an outer surface 128 of at least one adjacent cowling and/or one structure of the turbojet engine, in the closed configuration.

FIGS. 9 and 10 show, for example, the front end 82 of the lower cowling 66, which is, for example, made of a fibre-reinforced plastic type of composite material, which overlaps (i.e. at least partially covers) the outer rear end 52 of the front cowling 34, which is, for example, made of metal.

The inner surface 122 of the lower cowling 66, also shown in FIG. 11, is provided with first raised features 124, having for example two circumferential ribs 124A spaced apart from one another axially and connected to one another by axial ribs 124B spaced apart from one another. The ribs 124A, 124B thus define hollows 130 delimited by them both in the axial direction X and in the circumferential direction C.

The outer surface 128 of the front cowling 34 has second features 126 with a complementary shape to the first features 124, having, for example, two circumferential grooves 126A spaced apart from one another axially and connected to one another by axial grooves 126B spaced apart from one another (only one of which is shown in FIG. 10). The grooves 126A, 126B thus define bumps 132 delimited by them both in the axial direction X and in the circumferential direction C.

In this way, the ribs 124A, 124B of the lower cowling 66 and the grooves 126A, 126B of the front cowling 34 define reciprocal abutment surfaces both in the axial direction X and in the circumferential direction C.

The ribs 124A, 124B of the lower cowling 66 fit into the grooves 126A, 126B of the front cowling 34, while the bumps 132 of the front cowling 34 fit into the hollows 130 of the lower cowling 66. The features 124 and 126 thus establish a reciprocal fit between the lower cowling 66 and the front cowling 34, which involves support in both the axial direction X and the circumferential direction C.

The ribs 124A, 124B and grooves 126A, 126B advantageously have a cross-section with V-shaped sides 134, 135, separated, for example, by a flat base 136.

An interposing plastic layer 138 is, for example, provided on one of the surfaces 122 and 128 to improve contact between them, reduce any gaps between them and, if necessary, smooth or attenuate aerodynamic steps, i.e. differences in level between the outer surface 139 of the cowling in question 66 or 70 and the outer surface 128 of the aforementioned element. The interposing plastic is advantageously a durable plastic having a low coefficient of friction with the materials with which the layer 138 has to be in contact, for example a material marketed under the names ERTACETAL™ or TEFLON™. The interposing plastic layer 138 thus helps to ensure that the opening mechanism of the cowling in question functions correctly.

With reference to FIG. 11, through-holes 140 for the first removable through fasteners 86 are advantageously provided within the hollows 130 of the lower cowling 66. In a similar manner, with reference to FIG. 9, through-holes 142 for the first removable through fasteners 86 are advantageously provided within the bumps 132 of the front cowling 34, in alignment with the through-holes 140.

Moreover, the inclination of the sides 134, 135 is designed so as not to hinder the opening mechanism of the cowling in question, as will be explained in more detail below, and is adapted to the flow of shear force to pass between the elements. It is advantageous for said inclination to be significant so that the structure absorbs the maximum amount of shear and transmits only a small vertical component to the corresponding fasteners 86.

When overlapping is provided between the circumferential ends 78 of the lower cowling 66 and the circumferential ends 88 of the upper cowling 70, as in the examples shown, engagement by fitting together raised features as described above is advantageously provided between these circumferential ends 78, 88.

Such engagement by fitting together raised features is also advantageously provided at the interface between the upper cowling 70 and the front cowling 34.

Figure 12:
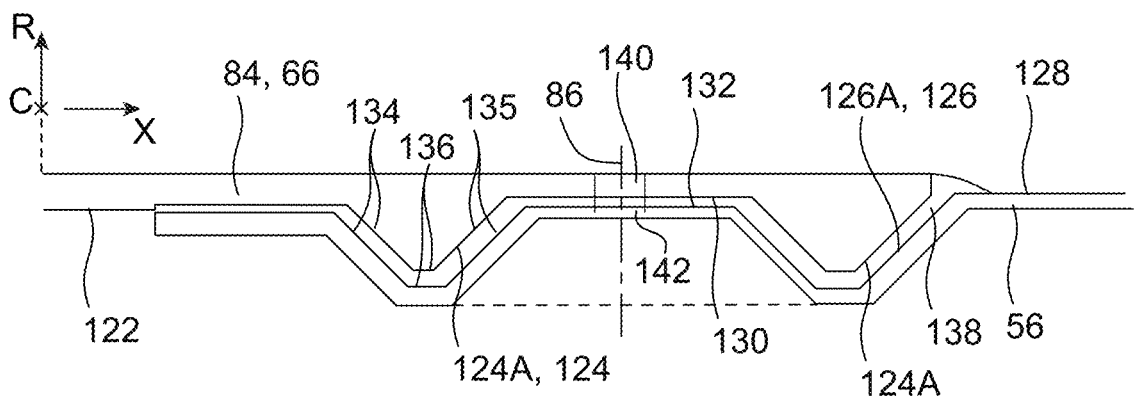
FIG. 12 is a view similar to FIG. 9, showing a region of overlap of an end part of the lower cowling and a structure of the turbojet engine.

FIG. 12 shows the rear end 84 of the lower cowling 66 which covers the rear partition 56. Here too, the inner surface 122 of the lower cowling 66 is provided with raised features 124, whilst the outer surface 128 of the rear partition 56 is provided with features 126 with a complementary shape, in a similar manner to what has been described above.

The axial and tangential supports created by the fitting together of the raised features 124, 126 enable part of the axial and tangential forces passing between adjacent cowlings or between a cowling and the structure of the turbojet engine to be absorbed, thereby reducing the stress on the removable through fasteners in question. The number and/or clamping force of these fasteners can thus be reduced, allowing in particular the use of quick-release fasteners. Moreover, such supports enable the parts in question to be locked relative to one other, thereby reducing friction between these parts.

FIGS. 13 to 26 show the implementation of the first aspect of the present invention in more detail, relating to the first hinge system 96, which will be described with continuous reference to FIGS. 3A-4B.

The first hinge system 96 consists of one or more hinge devices 144, preferably a central hinge device 144A and two side hinge devices 144B symmetrical to one another in relation to the median vertical plane of the propulsion unit (FIGS. 4A and 4B).

The side hinge devices 144B are advantageously offset in the axial direction X with respect to the central hinge device 144A. Such an arrangement enables the torque to be absorbed that tends to rotate the lower cowling 66 about a substantially vertical axis under the action of the opening force of an operator acting on just one side of the cowling. Alternatively, the three hinge devices 144 can be anchored to the turbojet engine in a same transverse plane, in which case the aforementioned torque is advantageously absorbed by means of an additional hinge device offset axially with respect to said transverse plane.

Figure 13:
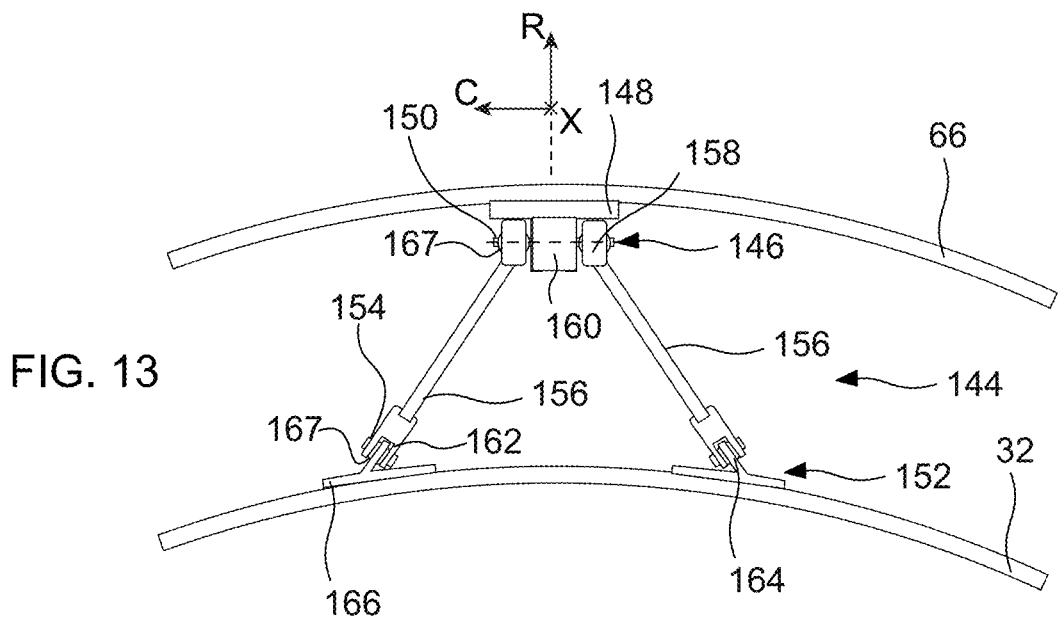
FIG. 13 is a partial schematic cross-sectional view of the propulsion unit shown in any one of FIGS. 3A, 5 and 7, showing a hinge device connecting the lower cowling to a fan casing of the turbojet engine and comprising fixed-length connecting rods.

With reference to FIG. 13, such a hinge device 144 has a first end 146 with a ball-and-socket connection to a corresponding base 148 rigidly supported by the lower cowling 66, and a second end 152, opposite, with a ball-and-socket connection to the turbojet engine, in this case to the fan casing 32.

In the example shown in FIG. 13, the hinge device 144 has two connecting rods 156 which, in the closed position, are, for example, arranged symmetrically in relation to a median axial plane XR of the device. The connecting rods 156 have respective first ends 158 in the form of rings, connected by ball-and-socket joints to a first hinge pin 150 extending orthogonally to the axis 28 and supported by a clevis 160 of the base 148 on either side thereof, and which together define the first end 146 of the hinge device 144. In addition, the connecting rods 156 have respective second ends 162 in the form of rings, connected by ball-and-socket joints to respective second hinge pins 154 extending orthogonally to the axis 28 and supported by respective clevises 164 of corresponding bases 166 rigidly secured to the fan casing 32. The aforementioned rings typically form cages for receiving ball joints 167 mounted on the corresponding pin 150, 154. The first hinge pin 150, common to both connecting rods 156, extends substantially in the circumferential direction C.

In the case shown in FIG. 13, the connecting rods 156 being of fixed length, the arrangement of the side hinge devices 144B is such that, for the latter, the points of connection of the second ends 162 to the second hinge pins 154 are offset from one another in the axial direction X so as to allow the circumferential ends 78 of the lower cowling 66 to spread by circumferential elastic deformation. To the same end, the first ends 158 are connected to the first hinge pin 150 with a certain degree of freedom of movement in the direction of this pin. To this end, the corresponding ball joints are, for example, mounted on the first hinge pin 150 with play in the direction of this pin.

Figure 14:
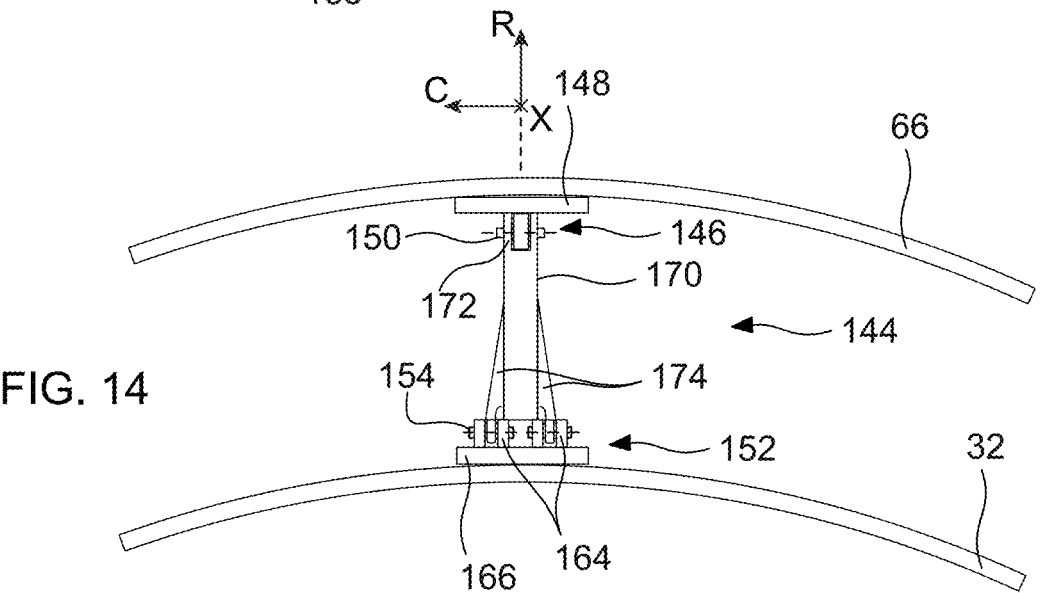
FIG. 14 is a view similar to FIG. 13, showing an alternative.

FIG. 14 shows a variant in which such a hinge device 144 has a single connecting rod 170 centred in relation to the median axial plane XR of the device. The connecting rod 170 preferably has a reinforced structure with, for example, a first end 172 in the form of a double ring defining an air gap in which the clevis 160 of the base 148 is housed, and a second end consisting of two legs 174 having respective ends each provided with a corresponding ring and hinged respectively to two clevises 164 supported by a common base 166. In such a case, the second hinge pin 154, common to both legs 174, extends substantially in the circumferential direction C.

Figure 15:
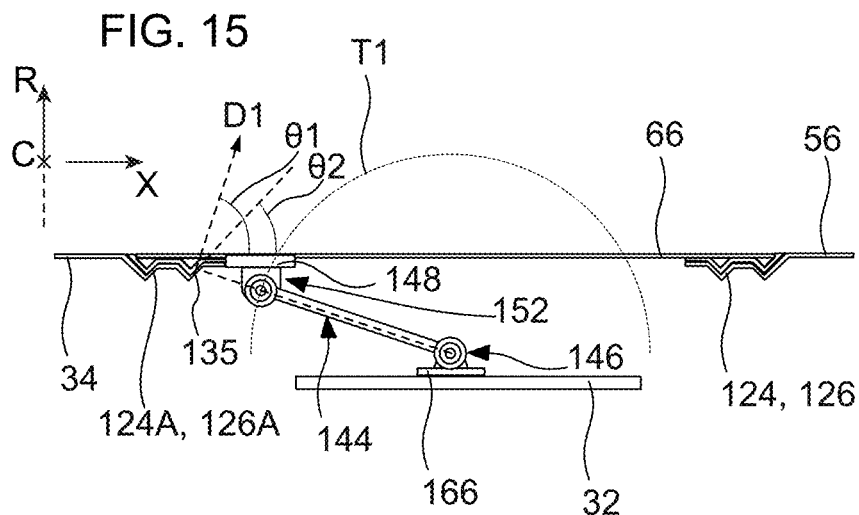
FIG. 15 is a partial schematic view of the propulsion unit shown in any one of FIGS. 3A, 5 and 7 in axial section, showing the lower cowling in the closed position.
Figure 16:
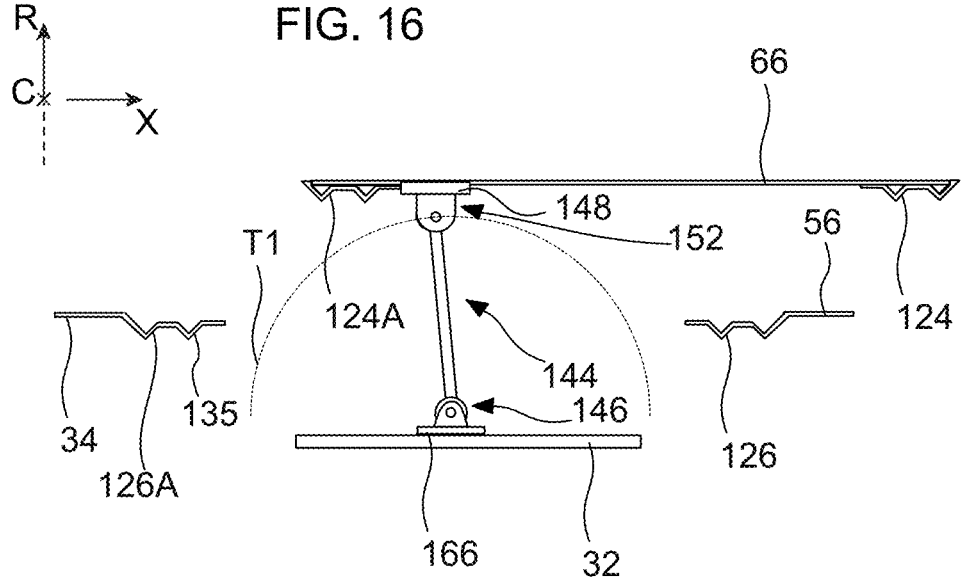
FIG. 16 is a view similar to FIG. 15, showing the lower cowling as it moves to its open position.
Figure 17:
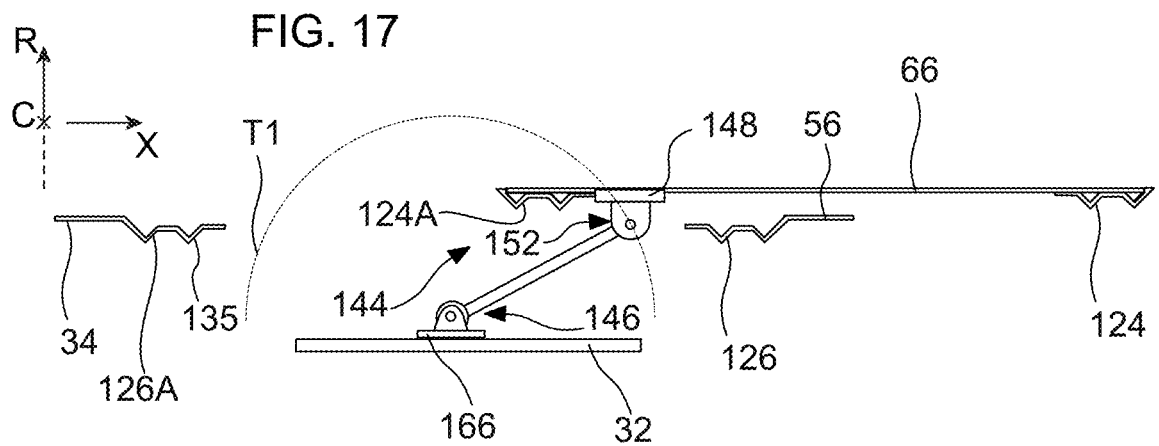
FIG. 17 is a view similar to FIG. 15, showing the lower cowling in the open position.

With reference to FIGS. 15 to 17, the movement of the lower cowling 66 from the closed position (FIG. 15) to the open position (FIG. 17) substantially involves, for each hinge device 144, a translation of the corresponding base 148 along a circular path T1.

As shown in FIG. 15, the movement of the lower cowling 66 is enabled by the fact that the initial direction D1 of the movement forms, with the axial direction X, an angle θ1 greater than an angle θ2 defined between the downstream sides 135 of the circumferential ribs 124A and circumferential grooves 126A on the one hand, and the axial direction X on the other.

As shown in FIGS. 16 and 17, the movement of the lower cowling 66 to the open position involves the cowling spreading transversely to the axis 28, and the cowling shifting in the axial direction X, for example backwards. As explained above, the lower cowling is spread transversely to the axis 28 by means of bending deformation of the cowling in the circumferential direction, i.e. with a bending moment substantially parallel to the axis 28, which can be complemented in some cases by slight torsional deformation of the cowling.

In preferred variants, the (or each) hinge device 144 comprises at least one passive sliding link member designed to allow a variation in the spacing between the first end 146 and the second end 152 of the hinge device. Such a variation in the spacing between the ends makes it generally possible to reduce the spreading of the cowling in question in the transverse direction, imposed by the kinematics of the device, and therefore to reduce the stresses applied to the cowling to enable it to move.

Instead of the connecting rod 170 or connecting rods 156, such a hinge device 144 therefore has one or more passive sliding link members. Such a member has two parts which are slidably connected to each other and can therefore move relative to each other in a straight-line translational movement, one of the parts defining the first end 146 of the hinge device 144 whilst the other part defines the second end 152 of the device.

Figure 18:
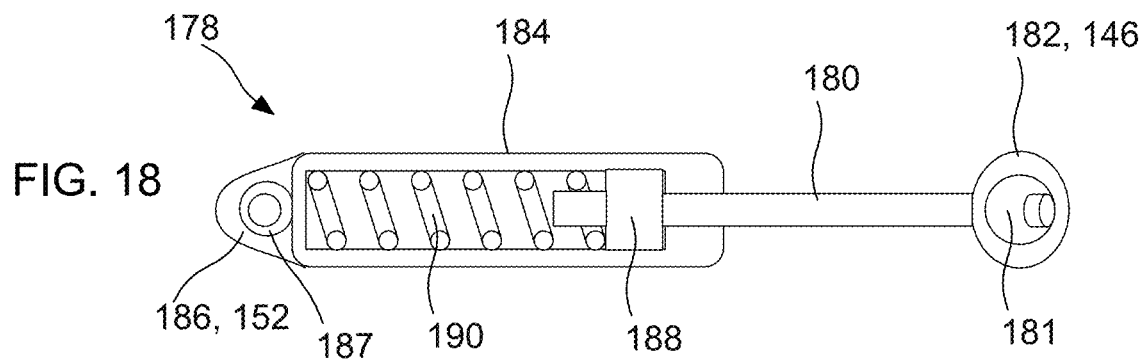
FIG. 18 is a schematic view of a passive actuator in axial section which is part of a hinge device according to one variant, shown in a deployed configuration.
Figure 19:
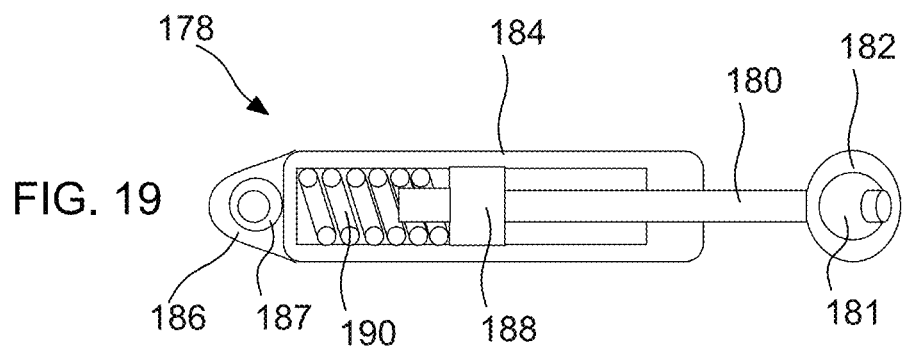
FIG. 19 is a view similar to FIG. 18, showing the passive actuator in a retracted configuration.
Figure 20:
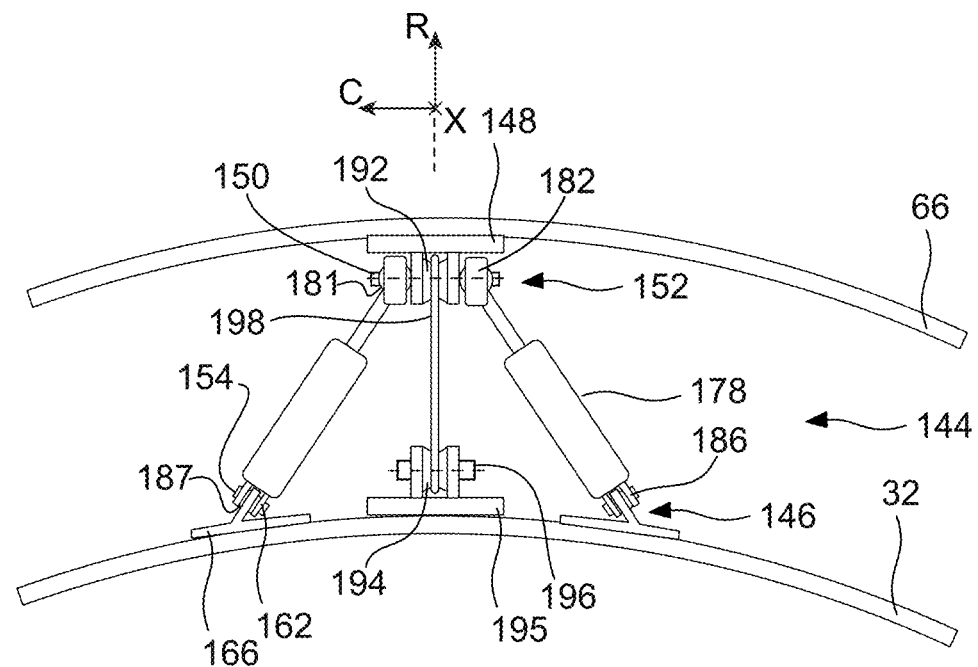
FIG. 20 is a view similar to FIG. 13, showing a variant in which the fixed-length connecting rods of the hinge device are replaced by passive actuators such as the one shown in FIGS. 18 and 19, and wherein the hinge device also has means for constraining its end on the cowling side along an elliptical path.
Figure 21:
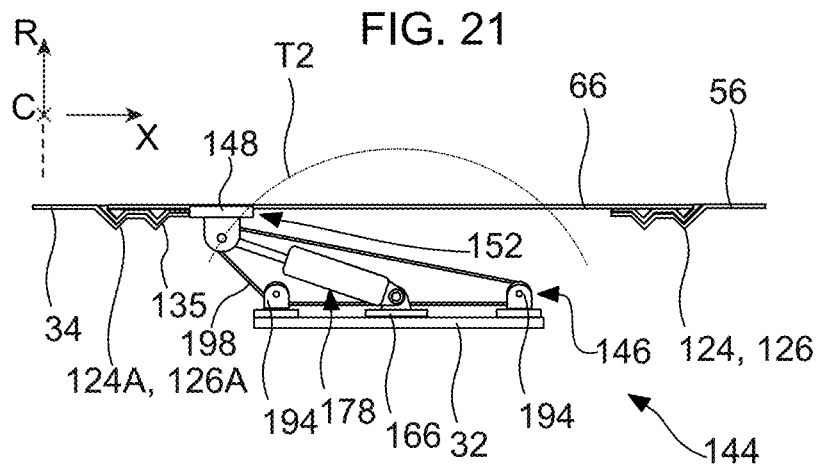
FIG. 21 is a view similar to FIG. 15, showing a variant in which the hinge device is of the type shown in FIG. 20.
Figure 22:
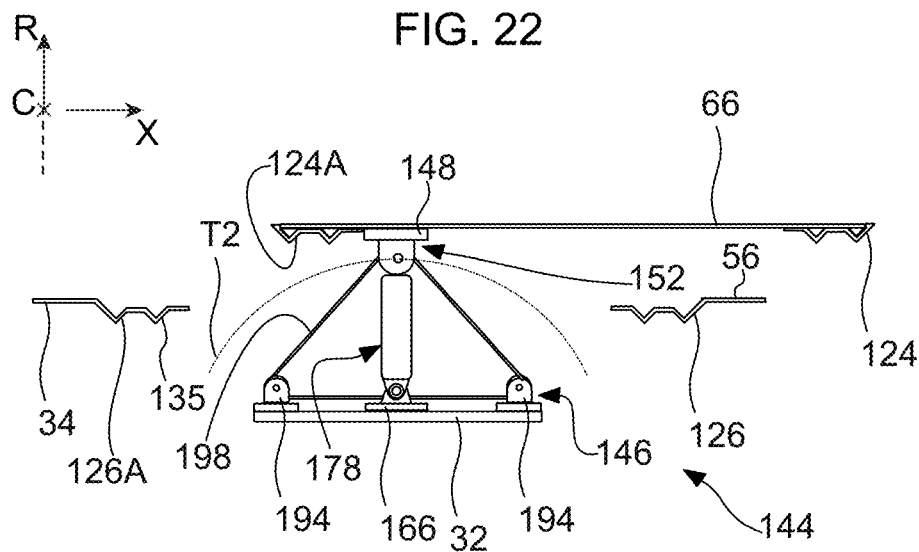
FIG. 22 is a view similar to FIG. 16, showing the variant in which the hinge device is of the type shown in FIG. 20.
Figure 23:
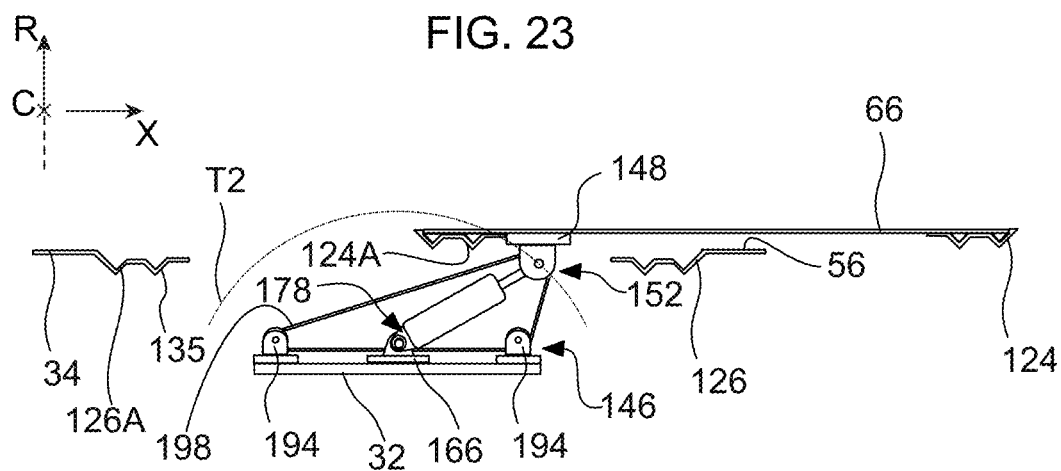
FIG. 23 is a view similar to FIG. 17, showing the variant in which the hinge device is of the type shown in FIG. 20.

Preferably, the (or each) passive sliding link member is a passive actuator 178, as shown in FIGS. 18 and 19. Such an actuator has a rod 180 provided with a ring 182 which defines, for example, the first end 146 of the hinge device 144, and a body 184 provided with a ring 186 defining, for example, the second end 152 of the device. The rod 180 has a piston 188 housed in the body 184 and moved towards the ring 182 of the rod 180 by an elastic means, such as a spring 190 housed in the body 184, or, alternatively, a pressurised gas trapped in a chamber delimited by the piston 188 within the body 184. The rings 182 and 186 form, here too, receiving cages for ball joints 181, 187 intended to be mounted on the hinge pins 150, 154.

The elastic means in particular reduces the effort required from operators when opening and closing the lower cowling 66.

FIGS. 20 to 23 show a hinge device 144 similar to the one shown in FIG. 13, but the connecting rods of which have been replaced by passive actuators 178.

The hinge device 144 shown in FIGS. 20-23 also comprises means for constraining the first end 146 of the device along an elliptical path T2. Such means comprise a first pulley 192 mounted on the base 148 supported by the lower cowling 66, with the ability to rotate in the direction of the first hinge pin 150; two second pulleys 194 mounted on the turbojet engine, in this case on bases 195 provided for this purpose on the fan casing 32, with the ability to rotate along axes 196 parallel to the first hinge pin 150 and substantially defining two foci of the elliptical path; and a closed cable 198, engaged around the first pulley 192 and the second pulleys 194.

The cable 198 forces the sum of the distances between the first hinge pin 150 and each of the axes 196 defined by the second pulleys 194 to be constant whatever the position of the lower cowling 66.

In addition, the or each passive actuator 178 of the device is designed to permanently force the first pulley 192 against the cable 198 so as to maintain the latter in a tensioned state.

As a result, the path of the first hinge pin 150 is an ellipse (the centres of the second pulleys 194 being substantially the foci of this ellipse). The same applies to the base 148, and therefore to the whole of the lower cowling 66 to which the said base 148 is secured. Such an elliptical path T2 makes it possible to increase the amplitude of axial displacement of the lower cowling 66 for a given level of radial displacement (and therefore of bending deformation), compared with the circular path T1 inherent in the use of fixed-length connecting rods as in the embodiments described above with reference to FIGS. 13-17.

Alternatively, the second pulleys 194 can be replaced by fixed attachment points for the cable 198 on the bases 195, or by eyelets integral with the bases 195 in which the cable 198 is held.

Furthermore, the passive actuators s 178 can, alternatively, be dimensioned so as to be in maximum extension, and therefore have a constant length, at the start and end of the path, in which case the cable 198 is not under tension. In a median part of the path, the passive actuators 178 are compressed by the cable so that said median part has the elliptical character described above. Such a variant has the advantage of increasing the angle θ1 at the start of the path in order, if necessary, to disengage the features 124 and 126 more easily.

Figure 24:
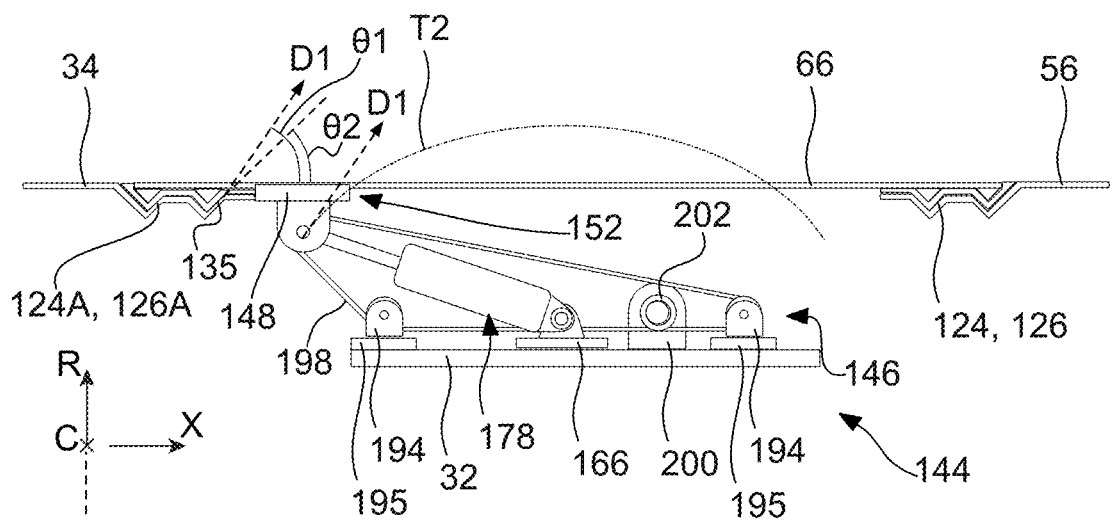
FIG. 24 is a view similar to FIG. 21, showing a variant in which the hinge device also has a drive means.

With reference to FIG. 24, a hinge device 144 similar to the one shown in FIGS. 20-23 also has a drive member 200, for example a motor having an output shaft 202 in contact with the cable 198 such that rotation of the output shaft 202 causes the cable 198 to move around all three pulleys 192, 194, and therefore causes the base 148 to move along the elliptical path T2.

Figure 25:
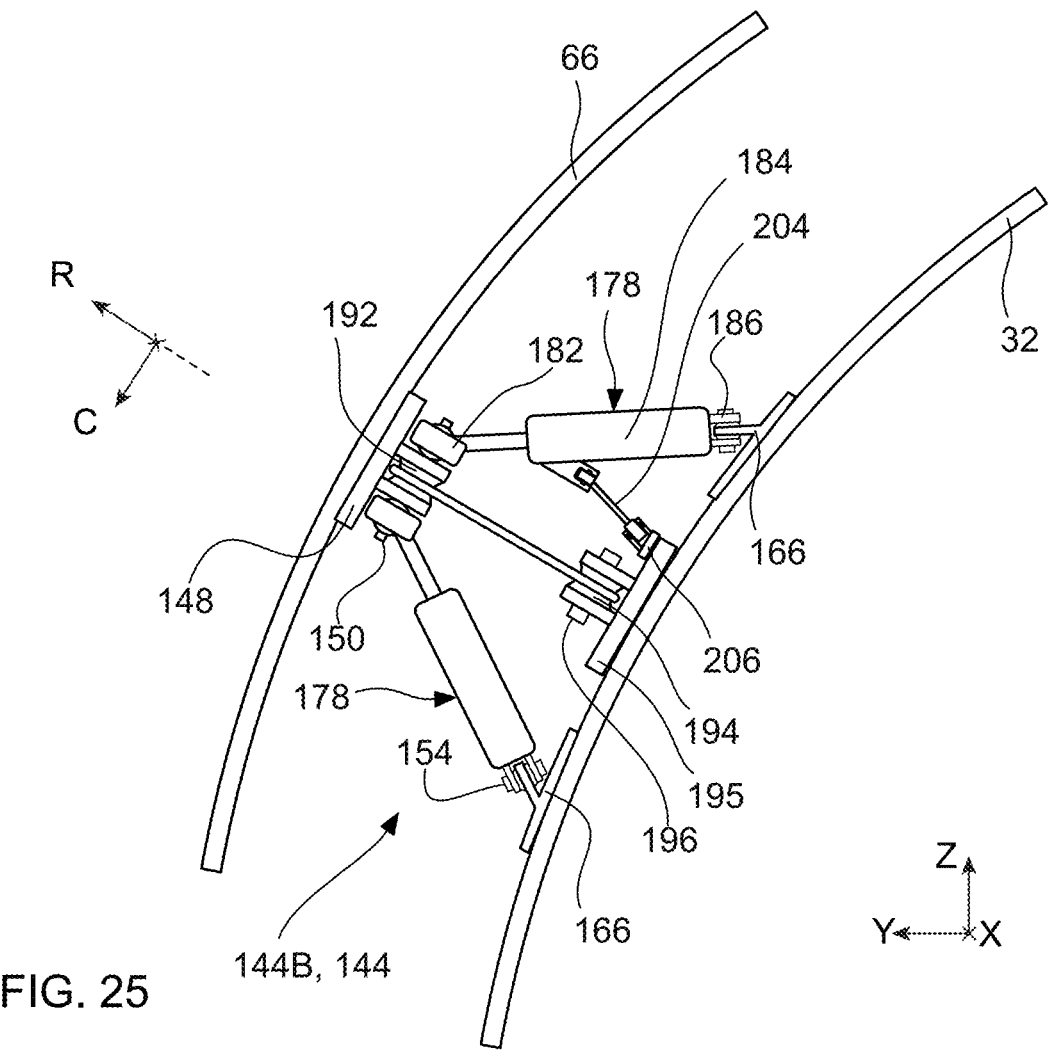
FIG. 25 is a view similar to FIG. 20, showing a variant in which the hinge device has lateral reinforcement means.

FIG. 25 shows one of the side hinge devices 144B in a configuration similar to the one shown in FIGS. 20-23 or FIG. 24, but also comprising a reinforcing rod 204 connecting a part of the body 184 of one of the passive actuators 178 remote from the ring 186 thereof to a base 206 provided for this purpose on the fan casing 32 (and partially masked in FIG. 25 by one of the bases 195) in order to help absorb gravity-induced forces. The base 206 can alternatively be combined with the base 195. The connections between the ends of the reinforcing rod 204 and the body 184 of the actuator in question and the base 206 respectively are ball-and-socket connections. In the example shown, the reinforcing rod 204 is arranged on the upper side of the device so as to operate under compression. Alternatively, such a reinforcing rod can be arranged on the lower side of the device so as to operate under tension. The reinforcing rod 204 constrains the path of the passive actuator 178 in question and thus ensures that the latter bears some of the weight of the lower cowling 66 laterally.

Figure 26:
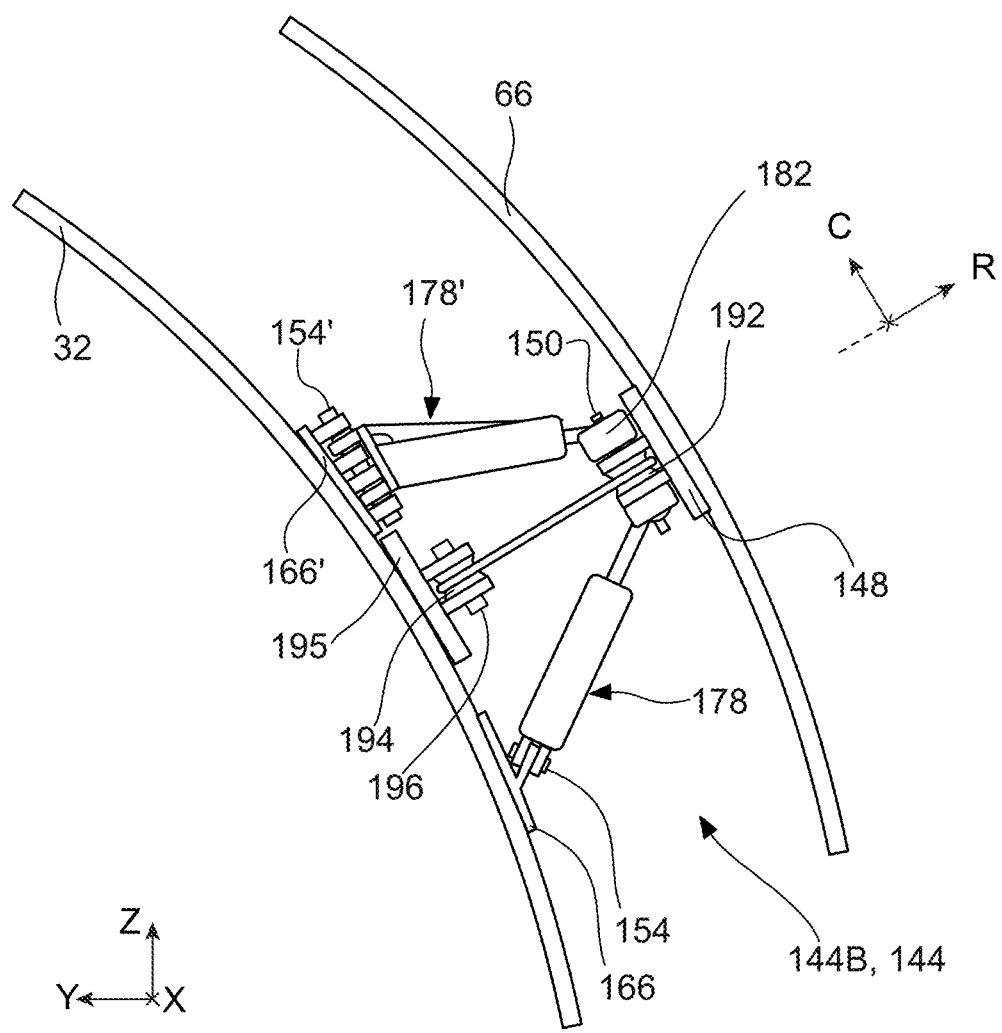
FIG. 26 is a view similar to FIG. 20, showing another variant in which the hinge device has lateral reinforcement means.

FIG. 26 shows one of the side hinge devices 144B in another configuration also similar to the one shown in FIGS. 20-23 or FIG. 24, but in which one of the passive actuators with reference numeral 178' is connected to the corresponding base 166' by a pivot connection rather than a ball-and-socket connection. The corresponding second hinge pin 154' in this case extends substantially in the circumferential direction C. The passive actuator 178' has one or more ring(s) 186 defining the second end 152 of the device 144B, mounted pivotably on the corresponding second hinge pin 154.

Generally speaking, in view of the information presented above, the sizing of the hinge devices 144 enabling the lower cowling 66 to be opened and closed without applying harmful stress to the latter is within the competence of a person skilled in the art.

In this respect, the base 148 of each of the side hinge devices 144B can, alternatively, be mounted so as to be moveable on the inner surface of the lower cowling 66 along a path having at least one circumferential component, instead of being rigidly attached to this cowling as in the examples described above. The aim of such an arrangement is to enable the base 148 to move towards the corresponding circumferential end 78 of the lower cowling during the overall bending deformation of the latter at the start of an opening manoeuvre.

Figure 27A:
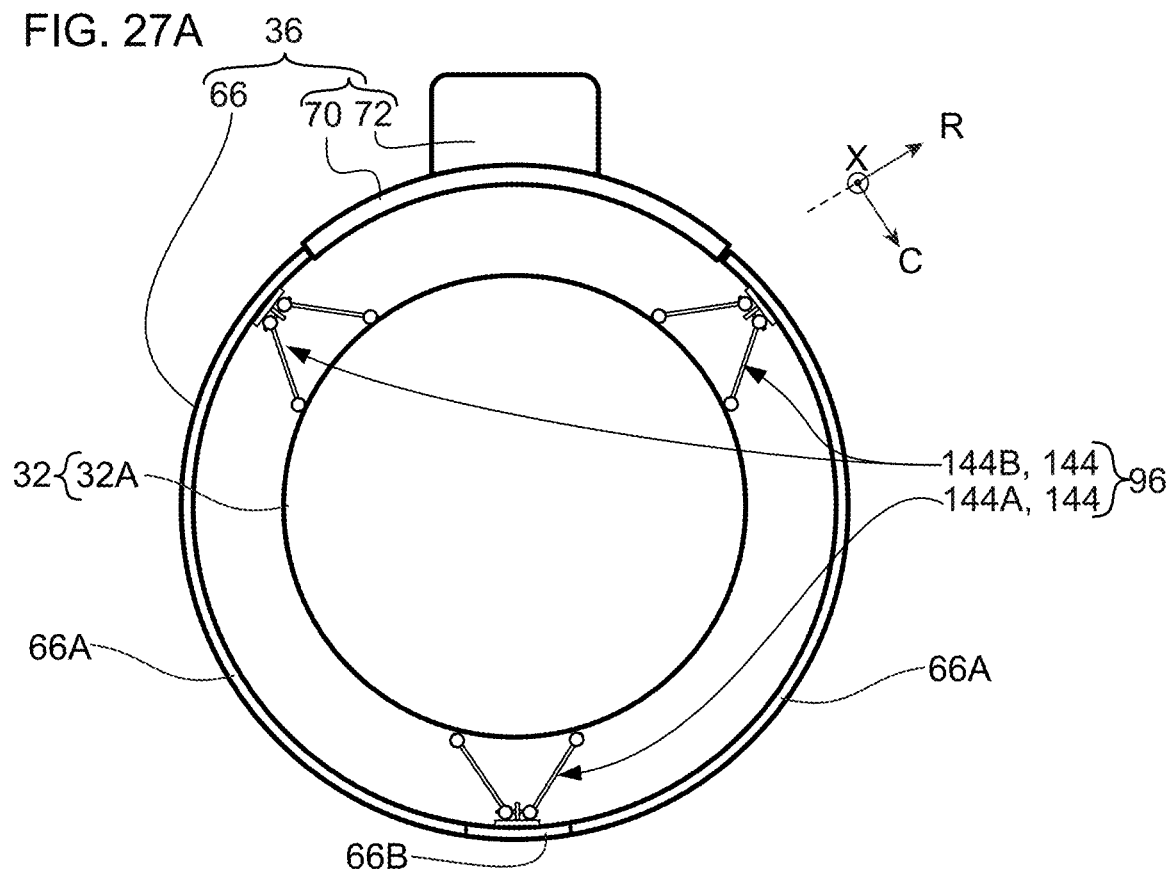
FIG. 27A is a view similar to FIG. 3B, showing another variant in which the lower cowling has an elastically deformable median strip.
Figure 27B:
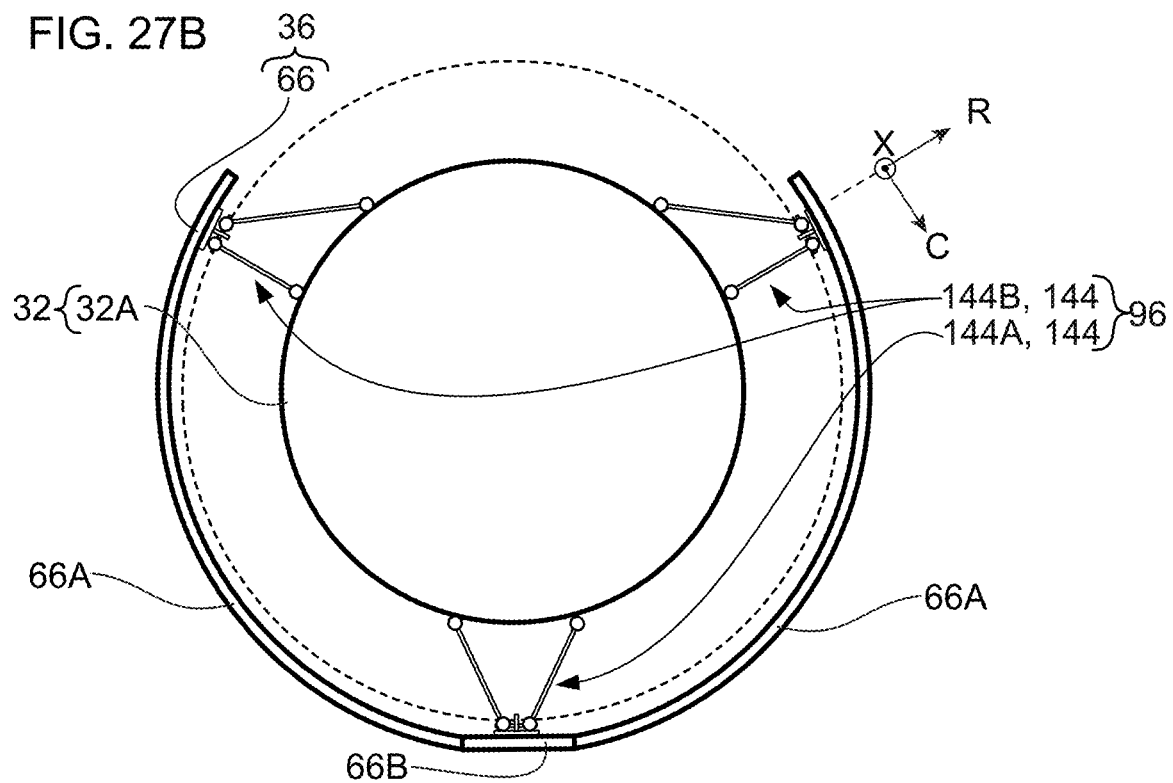
FIG. 27B is a view similar to FIG. 4B, showing the variant shown in FIG. 27A.

FIGS. 27A and 27B show a variant in which the lower cowling 66 has two rigid side portions 66A connected to one another by an elastically deformable median strip 66B, facilitating the overall bending deformation of the lower cowling 66 at the start of an opening manoeuvre. To this end, the median strip 66B is, for example, made of an elastomeric material.

Generally speaking, it should therefore be understood that the lower cowling 66 preferably follows a generally curvilinear translational movement between its closed and open positions.

Figure 28:
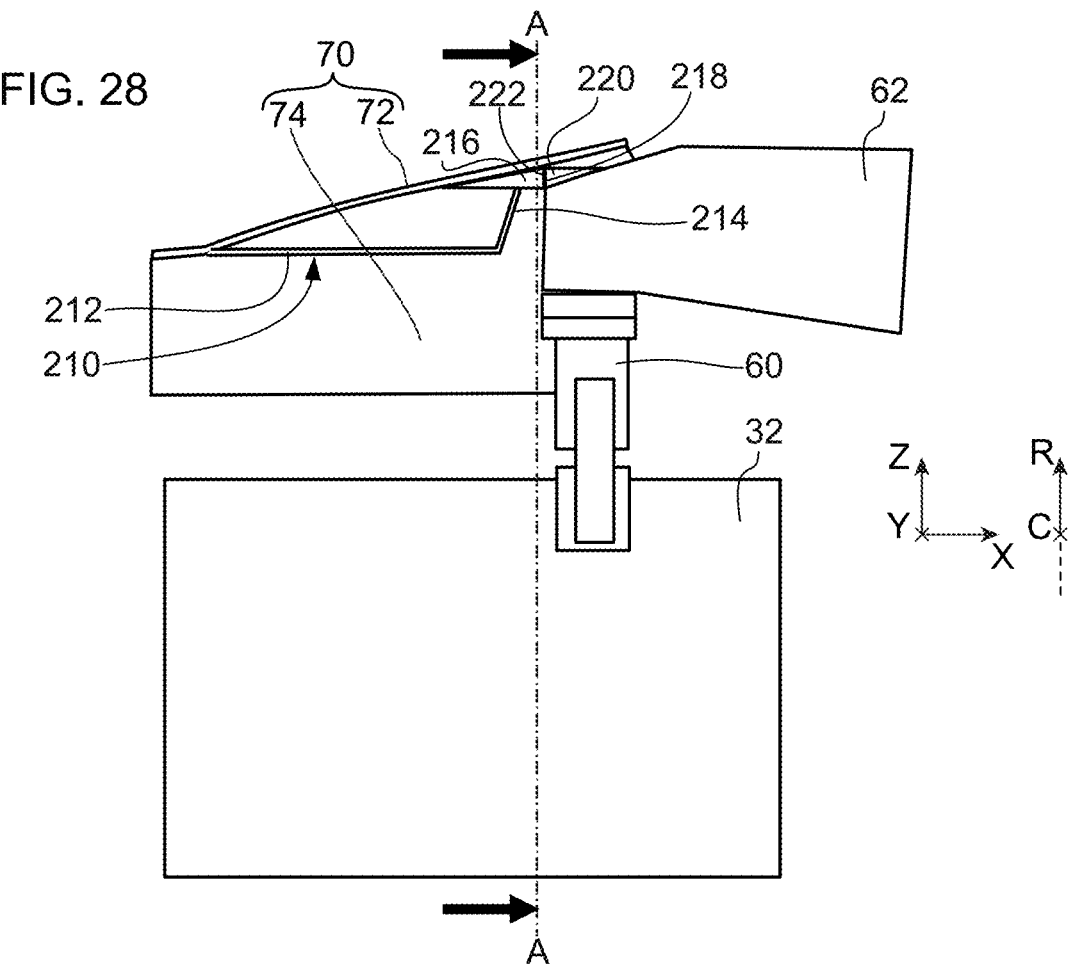
FIG. 28 is a partial schematic side view of the propulsion unit shown in any one of FIGS. 3B, 5 and 7 in axial section, showing in particular an inner support structure for the upper cowling, by means of which the latter is axially supported on a support structure of the pylon.
Figure 29:
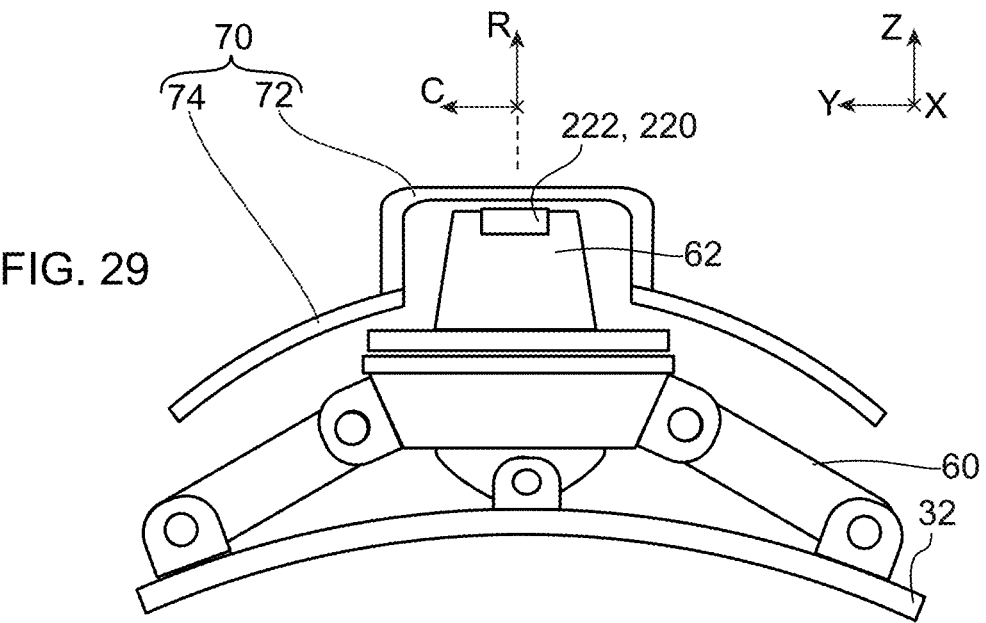
FIG. 29 is a partial schematic cross-sectional view of the propulsion unit shown in any one of FIGS. 3B, 5 and 7, along the plane A-A shown in FIG. 28, showing in particular the support structure of the pylon and a front engine mount.

Furthermore, FIGS. 28 and 29 show the structure of the upper cowling in more detail and show axial support means by means of which the upper cowling 70 is able to transmit forces to the pylon 62.

The axial and tangential supports created by the fitting together of raised features 124, 126 as described above, at the interface between the upper cowling 70 and the front cowling 34, enable good transmission of forces from the front cowling 34 to the upper cowling 70. In particular, forces resulting from a high incidence of air intake, for example encountered during take-off, can be transmitted through the upper cowling much more efficiently than in known propulsion units.

In order to make the most of this improved transmission of forces, the upper cowling 70 has an inner reinforcing structure 210 having a closed hollow section (FIG. 28). Such a structure is, for example, formed by an extension 212 of the apron 74 under the pylon fairing 72, by a substantially radial base wall 214 connecting a rear end of the extension 212 to the pylon fairing 72, and by the pylon fairing itself, like a box.

The upper cowling 70 also comprises an inner support structure 216 embedded in the inner reinforcing structure 210 and having a rear support surface 218.

The pylon 62 has a support structure 220 (FIGS. 28 and 29) having a front support surface 222 arranged axially facing and in contact with the rear support surface 218 of the inner reinforcing structure 210 (FIG. 28), when the upper cowling is in the closed position.

The support surfaces 218 and 222 preferably extend transversely to the axis 28 of the propulsion unit, so as to only transmit axial forces. Thanks to the connection established by the second removable through fasteners 90 between the lower cowling 66 and the upper cowling 70, the support structures 216 and 220 thus enable in particular an efficient transmission of the forces resulting from the bending moment experienced by the upper cowling 70 and the lower cowling 66 when the aircraft fitted with such a propulsion unit pitches up, which makes it possible to limit the deformation of these cowlings.

The invention claimed is:

1. A propulsion unit for an aircraft, comprising:
   a turbojet engine comprising a fan and a fan casing surrounding the fan; and
   a nacelle surrounding the turbojet engine and comprising a fan compartment delimited internally by the fan casing;
   wherein the nacelle comprises, from upstream to downstream along an axis of the propulsion unit:
   a front cowling forming an air inlet; and
   an intermediate section having at least one intermediate cowling of fixed and removable type, externally delimiting the fan compartment, and attached to at least one other structure of the propulsion unit by removable through fasteners, said at least one other structure comprising at least one of the front cowling, a rear partition rigidly supported by the fan casing, and another cowling of the intermediate section;
   wherein said at least one intermediate cowling is connected to another element of the propulsion unit by means of a hinge system which, as a result of removing said removable through fasteners, is designed to allow the intermediate cowling to be moved between a closed position, in which the intermediate cowling extends continuously with the front cowling, and an open position, in which the intermediate cowling is shifted upstream or downstream relative to its location in the closed position so as to open the fan compartment; and
   wherein said at least one intermediate cowling comprises a lower cowling extending at least in a lower angular portion of the propulsion unit, for which said removable through fasteners comprise at least first removable through fasteners by which said lower cowling is attached to said other structure of the propulsion unit, for which said other element of the propulsion unit is the turbojet engine, and for which the open position is a position in which said lower cowling is transversely spread, by means of a circumferential bending deformation of said lower cowling, and axially offset, relative to its location in the closed position.

2. The propulsion unit according to claim 1, wherein the hinge system has at least two hinge devices each having a first end hinged to said at least one intermediate cowling, and a second end, opposite, hinged to said other element of the propulsion unit, so as to allow the intermediate cowling to move between the closed position and the open position.

3. The propulsion unit according to claim 2, wherein each of the hinge devices comprises at least one passive sliding link member designed to allow a variation in spacing between the first end and the second end of the hinge device.

4. The propulsion unit according to claim 3, wherein said passive sliding link member is a passive actuator.

5. The propulsion unit according to claim 3, wherein each of the hinge devices also comprises means for constraining the first end of the hinge device along an elliptical path.

6. The propulsion unit according to claim 5, wherein said means for constraining the first end of the hinge device along the elliptical path comprise:
   a first pulley mounted on said at least one intermediate cowling;
   two second pulleys mounted on said other element of the propulsion unit so as to define substantially two foci of the elliptical path; and
   a closed cable engaged around the first pulley and the second pulleys so as to force the first pulley to follow the elliptical path.

7. The propulsion unit according to claim 1, wherein said at least one intermediate cowling has an inner surface provided with first raised features designed to engage by interlocking with second features of complementary shape formed on an outer surface of said at least one other structure of the propulsion unit, in the closed position.

8. A propulsion unit for an aircraft, comprising:
   a turbojet engine comprising a fan and a fan casing surrounding the fan; and
   a nacelle surrounding the turbojet engine and comprising a fan compartment delimited internally by the fan casing;
   wherein the nacelle comprises, from upstream to downstream along an axis of the propulsion unit:
   a front cowling forming an air inlet; and an intermediate section having at least one intermediate cowling of fixed and removable type, externally delimiting the fan compartment, and attached to at least one other structure of the propulsion unit by removable through fasteners;
   wherein said at least one intermediate cowling is connected to another element of the propulsion unit by means of a hinge system which, as a result of removing said removable through fasteners, is designed to allow the intermediate cowling to be moved between a closed position, in which the intermediate cowling extends continuously with the front cowling, and an open position, in which the intermediate cowling is shifted upstream or downstream relative to its location in the closed position so as to open the fan compartment;
   wherein said at least one intermediate cowling comprises an upper cowling comprising a pylon fairing and an apron extending circumferentially on either side of the pylon fairing, and
   wherein the pylon fairing extends in front of the pylon in continuity with the pylon in the closed position and is spaced apart from the pylon in the open position.

9. The propulsion unit according to claim 8, wherein the upper cowling has a rear support surface arranged so as to exert pressure against a support structure of the pylon when the air inlet is subjected to a vertical thrust from bottom to top.

10. The propulsion unit according to claim 9, wherein the upper cowling has an inner reinforcing structure having a closed hollow section, and an inner support structure embedded in the inner reinforcing structure and having said rear support surface, and said support structure of the pylon has a front support surface arranged axially facing and in contact with the rear support surface of the inner reinforcing structure, when the upper cowling is in the closed position.

11. The propulsion unit according to claim 8, wherein the hinge system has at least two hinge devices each having a first end hinged to said at least one intermediate cowling, and a second end, opposite, hinged to said other element of the propulsion unit, so as to allow the intermediate cowling to move between the closed position and the open position.

* * * * *